United States Patent
DiFazio et al.

(10) Patent No.: US 9,301,156 B2
(45) Date of Patent: Mar. 29, 2016

(54) LOCATION DETERMINATION OF INFRASTRUCTURE DEVICE AND TERMINAL DEVICE

(75) Inventors: Robert A. DiFazio, Greenlawn, NY (US); Prabhakar R. Chitrapu, Blue Bell, PA (US); John M. McNally, Huntington, NY (US); Narayan P. Menon, Syosset, NY (US); James Nolan, Centerport, NY (US); Fred Schreider, Commack, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 13/583,589

(22) PCT Filed: Mar. 10, 2011

(86) PCT No.: PCT/US2011/027963
§ 371 (c)(1),
(2), (4) Date: Mar. 19, 2013

(87) PCT Pub. No.: WO2011/112849
PCT Pub. Date: Sep. 15, 2011

(65) Prior Publication Data
US 2013/0217408 A1    Aug. 22, 2013

Related U.S. Application Data

(60) Provisional application No. 61/312,584, filed on Mar. 10, 2010.

(51) Int. Cl.
*H04W 24/00* (2009.01)
*H04W 64/00* (2009.01)

(52) U.S. Cl.
CPC ............ *H04W 24/00* (2013.01); *H04W 64/003* (2013.01)

(58) Field of Classification Search
CPC .............................. H04W 24/00; H04W 64/00
USPC ............................................ 455/456.1–456.6
See application file for complete search history.

(56) References Cited

U.S. PATENT DOCUMENTS

| | | | | |
|---|---|---|---|---|
| 6,603,426 | B1 * | 8/2003 | Clark | 342/357.64 |
| 7,986,952 | B2 * | 7/2011 | Orler et al. | 455/456.1 |
| 8,295,218 | B2 | 10/2012 | Imamura et al. | |

(Continued)

FOREIGN PATENT DOCUMENTS

| | | |
|---|---|---|
| WO | 2007056738 | 5/2007 |
| WO | 09017877 A2 | 2/2009 |
| WO | 2009/100790 A1 | 8/2009 |

OTHER PUBLICATIONS

True Position, "TruePosition Hybrid Location Solutions," http:Hwww.trueposition.com/hybrid-location-solutions/(last visited Sep. 12, 2012).*

(Continued)

*Primary Examiner* — Brandon Miller
(74) *Attorney, Agent, or Firm* — Invention Mine, LLC

(57) ABSTRACT

A method and apparatus determines a physical location of a wireless infrastructure device. At least one coarse location data from an associated terminal device is determined. Additional coarse location data are stored and accumulated. The device location is considered accurate by determining that enough received coarse location data has been received.

20 Claims, 13 Drawing Sheets

(56) References Cited

U.S. PATENT DOCUMENTS

| | | | |
|---|---|---|---|
| 8,718,592 B2* | 5/2014 | Annamalai | 455/404.1 |
| 2003/0022675 A1 | 1/2003 | Mergler | |
| 2004/0236589 A1 | 11/2004 | Takahashi | |
| 2005/0272445 A1* | 12/2005 | Zellner | 455/456.2 |
| 2006/0211431 A1* | 9/2006 | Mansour et al. | 455/456.2 |
| 2008/0113674 A1* | 5/2008 | Baig | 455/456.3 |
| 2008/0182592 A1 | 7/2008 | Cha et al. | |
| 2008/0299992 A1 | 12/2008 | Eitan et al. | |
| 2008/0318596 A1* | 12/2008 | Tenny | 455/456.2 |
| 2009/0088183 A1* | 4/2009 | Piersol et al. | 455/456.1 |
| 2009/0098885 A1* | 4/2009 | Gogic et al. | 455/456.1 |
| 2010/0120447 A1* | 5/2010 | Anderson et al. | 455/456.1 |
| 2010/0214923 A1* | 8/2010 | Vivanco et al. | 370/235 |
| 2010/0246438 A1* | 9/2010 | Potkonjak | 370/254 |
| 2012/0071168 A1 | 3/2012 | Tomici et al. | |

OTHER PUBLICATIONS

"TruePosition Hybrid Location Solutions," Feb. 12, 2010 archive.org (a.k.a. "Wayback Machine") capture by of http://www.trueposition.com/web/guest/hybrid-location-solutions, captured on Jan. 15, 2016 from https://web.archive.org/web/20100212184355/http://www.trueposition.com/web/guest/hybridlocationsolutions.*

Chen et al., "Femtocells—Architecture & Network Aspects," Qualcomm (Jan. 28, 2010).

Lojack, "LoJack Car Security System for Stolen Vehicle Recovery," http://www.lojack.com/car/pages/car-works.aspx (Mar. 25, 2010).

Rosum Technology, "TV-Positioning," http://www.rosum.com/rosum_technology_tv-positioning.html (Jan. 17, 2010).

Skyhook Wireless, "How It Works," http://www.skyhookwireless.com/howitworks/ (Feb. 6, 2010).

Third Generation Partnership Project, "Technical Specification Group Radio Access Network; UTRAN architecture for 3G Home Node B (HNB); Stage 2 (Release 8)," 3GPP TS 25.467 V8.4.0 (Dec. 2009).

Third Generation Partnership Project, "Technical Specification Group Radio Access Network; UTRAN architecture for 3G Home Node B (HNB); Stage 2 (Release 8)," 3GPP TS 25.467 V8.6.0 (Dec. 2012).

Third Generation Partnership Project, "Technical Specification Group Radio Access Network; UTRAN architecture for 3G Home Node B (HNB); Stage 2 (Release 9)," 3GPP TS 25.467 V9.1.0 (Sep. 2009).

Third Generation Partnership Project, "Technical Specification Group Radio Access Network; UTRAN architecture for 3G Home Node B (HNB); Stage 2 (Release 9)," 3GPP TS 25.467 V9.6.0 (Dec. 2011).

Third Generation Partnership Project, "Technical Specification Group Radio Access Network; UTRAN architecture for 3G Home Node B (HNB); Stage 2 (Release 10)," 3GPP TS 25.467 V10.5.0 (Jun. 2012).

Third Generation Partnership Project, "Technical Specification Group Services and System Aspects; Telecommunication management; Study of Self-Organizing Networks (SON) related OAM for Home NodeB (Release 8)," 3GPP TR 32.821 V1.0.1 (Dec. 2008).

Third Generation Partnership Project, "Technical Specification Group Services and System Aspects; Telecommunication management; Study of Self-Organizing Networks (SON) related Operations, Administration and Maintenance (OAM) for Home Node B (HNB)(Release 9)," 3GPP TR 32.821 V9.0.0 (Jun. 2009).

True Position, "TruePosition Hybrid Location Solutions," http://www.trueposition.com/hybrid-location-solutions/ (last visited Sep. 12, 2012).

Loctronix, "Unified Location Sensing," http://www.rosum.com/rosum_technology_tv-positioning.html (2009).

Notification of transmittal of International Search Report and Written Opinion of the International Searching Authority for PCT/US2011/027963 mailed on Jul. 25, 2011, pp. 12.

Notification of transmittal of the International Preliminary Report on Patentability for PCT/US2011/027963 mailed on Jun. 14, 2012, pp. 13.

Third Generation Partnership Project, "Technical Specification Group Radio Access Network; UTRAN architecture for 3G Home Node B (HNB); Stage 2 (Release 9)," 3GPP TS 25.467 V9.1.0 (Dec. 2009).

Written Opinion of the International Preliminary Examining Authority for PCT/US2011/027963 mailed on Apr. 27, 2012, pp. 7.

\* cited by examiner

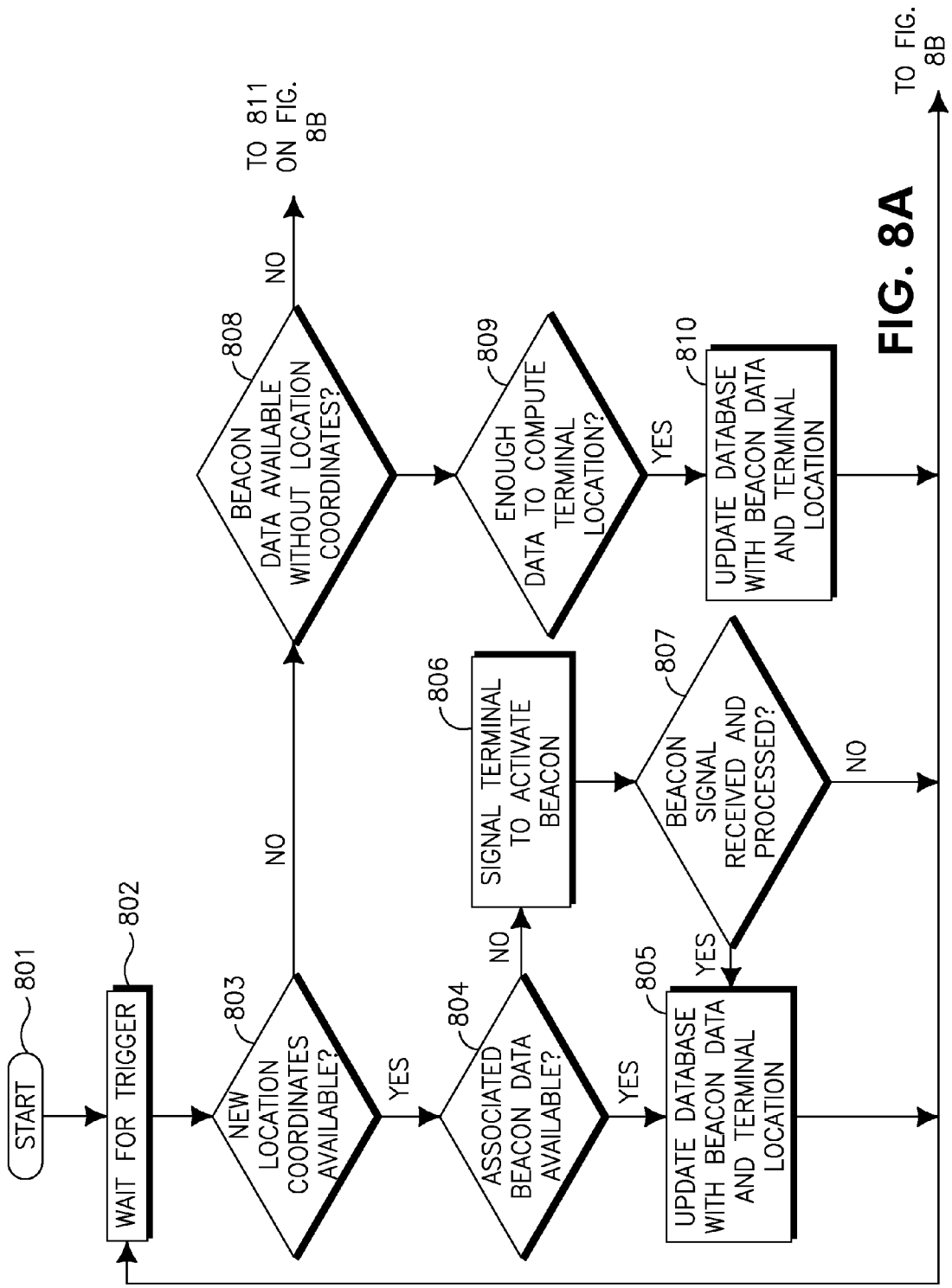

LOCATION DETERMINATION OF INFRASTRUCTURE DEVICE AND TERMINAL DEVICE

CROSS REFERENCE TO RELATED APPLICATIONS

This application claims priority to International Application No. PCT/US2011/027963, filed Mar. 10, 2011, which claims the benefit of U.S. Provisional Application No. 61/312,584, filed on Mar. 10, 2010, the contents of which are hereby incorporated by reference herein.

BACKGROUND

In a wireless communication environment, there are location technologies available today to determine a physical location of a wireless device, whether the device is installed in a fixed or semi-fixed location (e.g. a base station or access point), or is a mobile device.

To the extent that a technology can provide location coordinates, at least in some situations, it may be viewed as a "black box" and referred to as a stand-alone technology. These stand-alone technologies may share, for example, microprocessors, radios, antennas and other interfaces with other modules in a device; and may also include multiple network entities that are not co-located. However, acting as a system or subsystem they have external interfaces that will provide, or can be queried to provide, location coordinates. They typically are also able to indicate when coordinates are not available.

Such stand-alone location technologies include global navigation satellite systems (GNSS) (e.g., GPS), beacon systems (e.g., LoJack), signals of opportunity, WiFi positioning using location almanacs, and hybrid techniques (e.g., Cell ID (CID), Enhanced Cell ID (E-CID), Angle of Arrival (AOA), Uplink Time Difference of Arrival (U-TDOA), and Assisted Global Positioning Systems (A-GPS)).

However, such stand-alone techniques are sometimes unable to provide location coordinates (e.g., indoors or other unfavorable locations). Some of these technologies are cost prohibitive for installation in a small mobile device. Hybrid techniques, that may combine data from several stand-alone technologies, have drawbacks that include dependency on cellular infrastructure and insufficient accuracy.

SUMMARY

A method and apparatus determine a location of an infrastructure device or a terminal device using coarse estimates and refined estimates. An infrastructure device includes a location processor that coordinates messaging with associated terminal devices to obtain location data. The terminal devices may provide location data based on temporary signals of opportunity. Location data may be provided from a local server almanac or a network server almanac of connectivity location databases.

BRIEF DESCRIPTION OF THE DRAWINGS

A more detailed understanding may be had from the following description, given by way of example in conjunction with the accompanying drawings wherein:

FIGS. 8A and 8B is an example method flow diagram of an infrastructure device determining a location of a terminal device.

DETAILED DESCRIPTION

The methods and systems described herein may be used in determining location of network devices that primarily apply where no stand-alone location technology, such as GPS, is available. An example scenario is an indoor location where even if an infrastructure device contains a GPS or A-GPS receiver, it may be unable to provide location data due to insufficient signal strength from the minimum number of required satellites. An example of an indoor infrastructure device is a femto cell base station installed at a semi-static location. A wireless operator generally needs to know the location of the femto cell base station in order to manage network coverage and to control interference, and would also need to know if it has been moved.

The methods and systems described herein may also be used to locate terminal devices directly associated with an infrastructure device, where the terminal devices may or may not be mobile. Examples include cell phones, desktop computers, laptop computers, printers, TVs, security camera, appliances, and any other device that might have wireless connectivity.

The techniques described may also be used to locate terminal devices indirectly associated with an infrastructure device via, for example, an ad hoc network. Some radio signals may be received and processed by the infrastructure device from members of the ad hoc network, but messages destined for the infrastructure device traverse the network hierarchy.

Figure 1A:
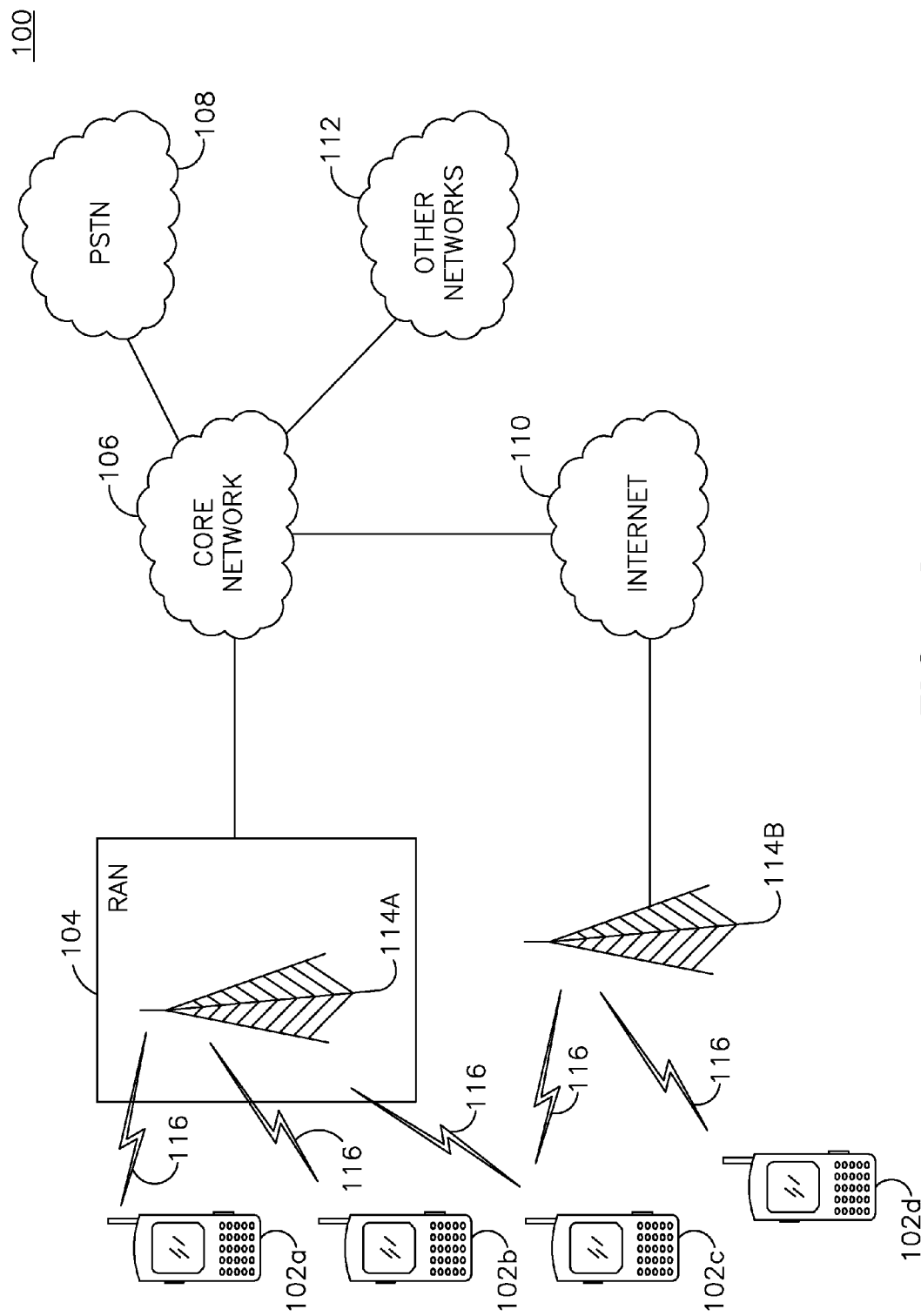
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a tablet computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a femtocell AP (FAP), a converged gateway, a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102*a*, 102*b*, 102*c*, 102*d* in the communications system 100 may include multi-mode capabilities, i.e., the WTRUs 102*a*, 102*b*, 102*c*, 102*d* may include multiple transceivers for communicating with different wireless networks over different wireless links. For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
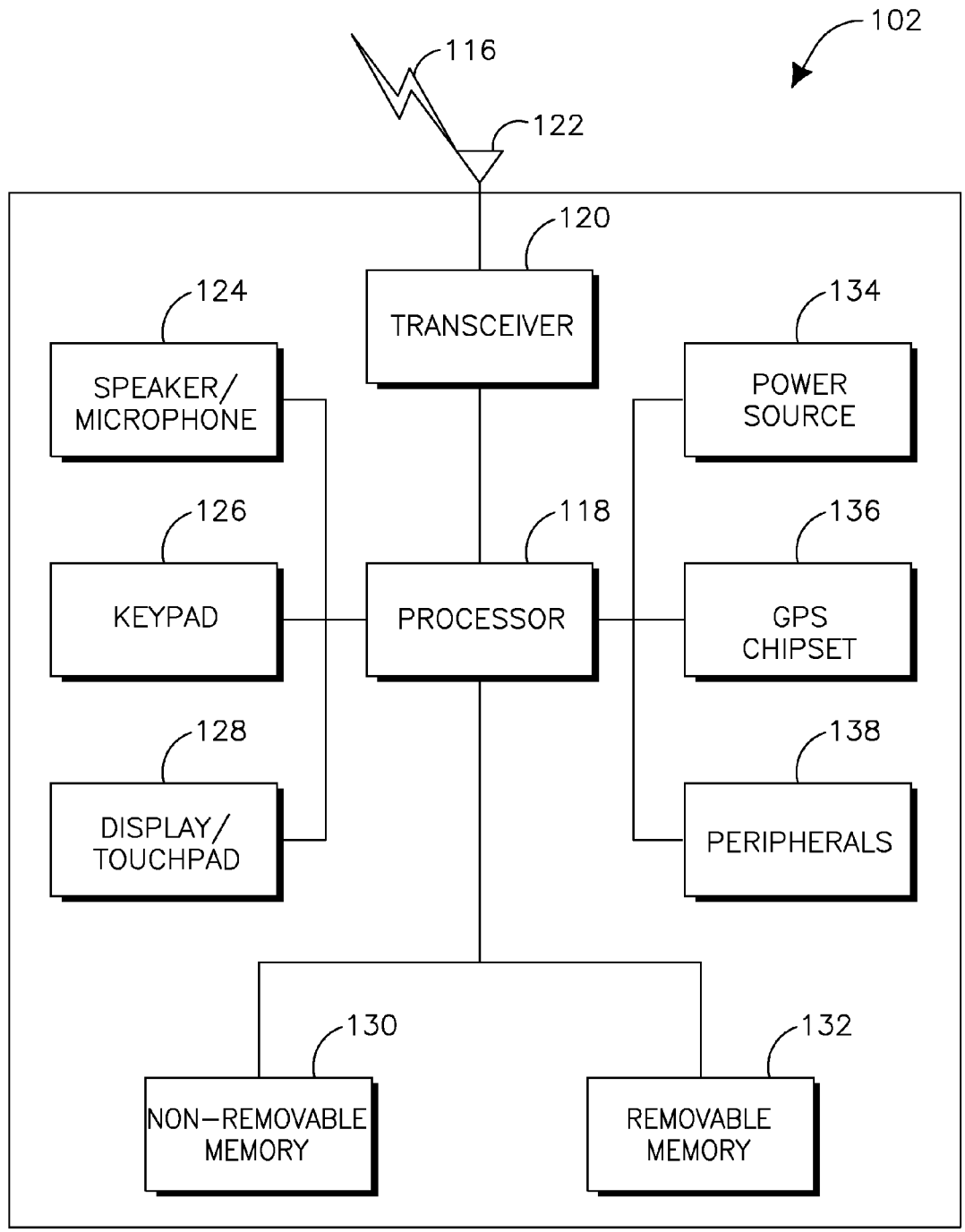
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a location determination chipset (e.g., global positioning system (GPS)) 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the location determination chipset 136, which may be configured to provide location information (e.g., longitude and latitude) regarding the current location of the WTRU 102. In addition to, or in lieu of, the information from the location determination chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
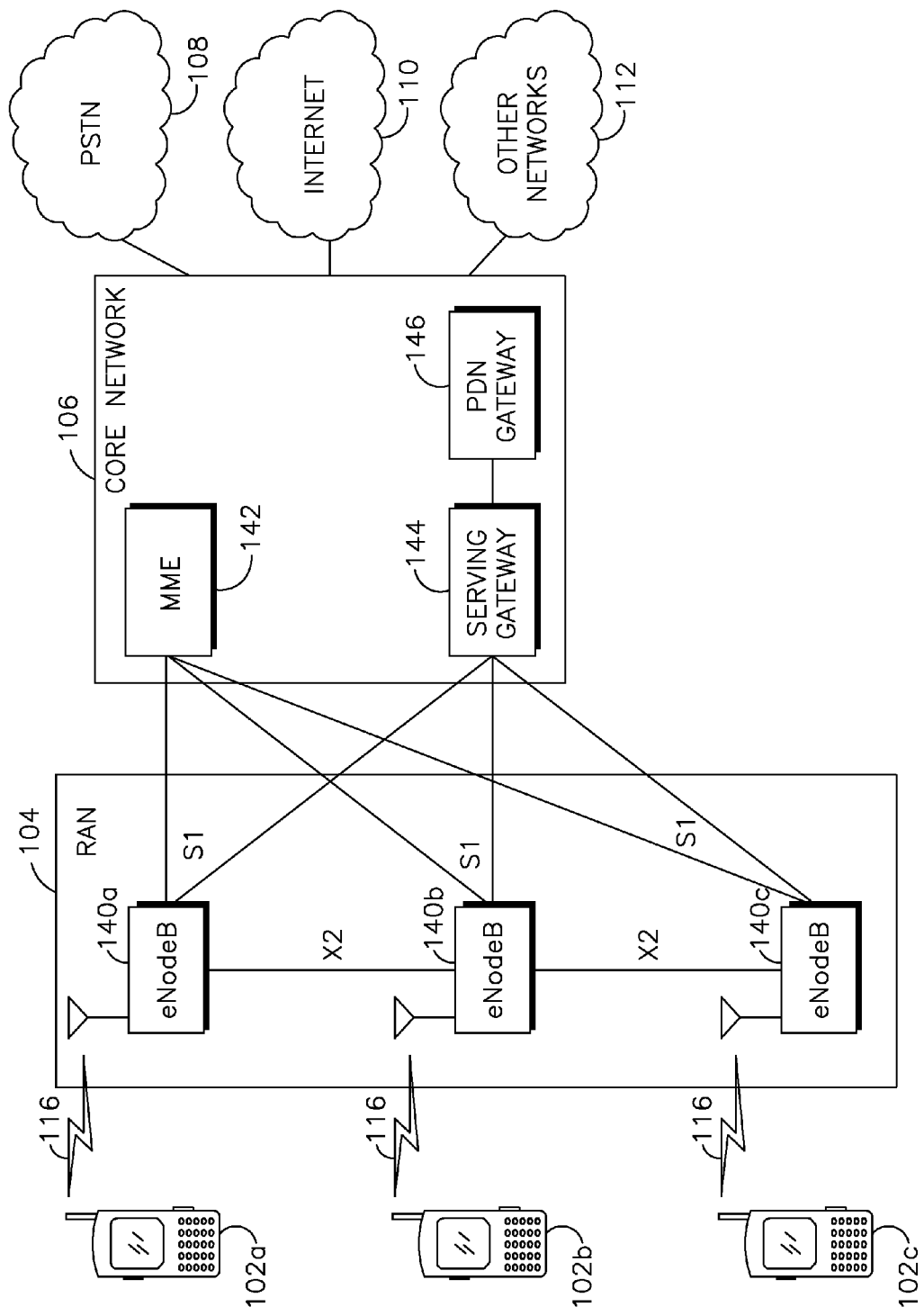
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102*a*, 102*b*, 102*c* over the air interface 116. The RAN 104 may also be in communication with the core network 106.

The RAN 104 may include eNode-Bs 140*a*, 140*b*, 140*c*, though it will be appreciated that the RAN 104 may include any number of eNode-Bs while remaining consistent with an embodiment. The eNode-Bs may be Home eNodeBs (HeNBs)/HeNB gateways, where the HeNBs may access the core network via the Internet and through a HeNB gateway. The eNode-Bs 140*a*, 140*b*, 140*c* may each include one or more transceivers for communicating with the WTRUs 102*a*, 102*b*, 102*c* over the air interface 116. In one embodiment, the eNode-Bs 140*a*, 140*b*, 140*c* may implement MIMO technology. Thus, the eNode-B 140*a*, for example, may use multiple antennas to transmit wireless signals to, and receive wireless signals from, the WTRU 102*a*.

Each of the eNode-Bs 140*a*, 140*b*, 140*c* may be associated with a particular cell (not shown) and may be configured to handle radio resource management decisions, handover decisions, scheduling of users in the uplink and/or downlink, and the like. As shown in FIG. 1C, the eNode-Bs 140*a*, 140*b*, 140*c* may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140*a*, 140*b*, 140*c* in the RAN 104 via an S1 interface and may serve as a control node. For example, the MME 142 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 142 may also provide a control plane function for switching between the RAN 104 and other RANs (not shown) that employ other radio technologies, such as GSM or WCDMA.

The serving gateway 144 may be connected to each of the eNode Bs 140*a*, 140*b*, 140*c* in the RAN 104 via the S1 interface. The serving gateway 144 may generally route and forward user data packets to/from the WTRUs 102*a*, 102*b*, 102*c*. The serving gateway 144 may also perform other functions, such as anchoring user planes during inter-eNode B handovers, triggering paging when downlink data is available for the WTRUs 102*a*, 102*b*, 102*c*, managing and storing contexts of the WTRUs 102*a*, 102*b*, 102*c*, and the like.

The serving gateway 144 may also be connected to the PDN gateway 146, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The core network 106 may facilitate communications with other networks. For example, the core network 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102*a*, 102*b*, 102*c* with access to the networks 112, which may include other wired or wireless networks that are owned and/or operated by other service providers.

Figure 2:
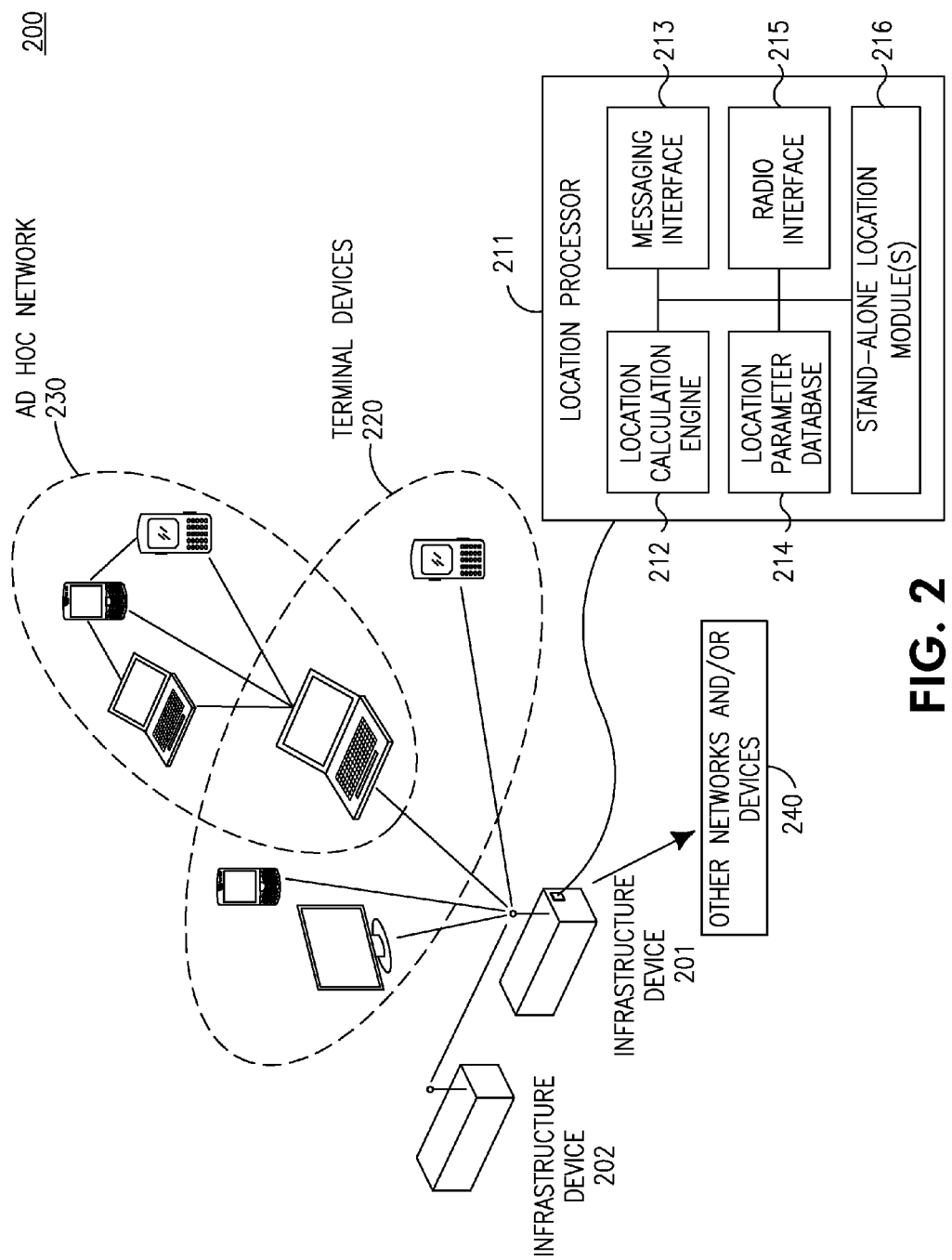
FIG. 2 is an example block diagram of an infrastructure device having a location processor within a wireless network.

FIG. 2 shows a network system 200 that includes an infrastructure device 201 in communication with another infrastructure device 202, each of which infrastructure device 201, 202 may be configured as base station 114*a*, 114*b*, terminal devices 220 which may be configured as the WTRU 102, an ad hoc network 230, and other networks and/or devices 240. The infrastructure device 201 comprises a location processor 211 that is used to determine the location of the infrastructure device 201 and/or the terminal devices 220. The location processor comprises a number of functions that may be distinct hardware, firmware, or software modules, or combined, including a location calculation engine 212, a messaging interface 213, a location parameter database 214, a radio interface 215 and at least one stand-alone location module 216. Any one or more of these location processor 211 entities may be distributed among other modules within the infrastructure device 201 rather than a stand-alone entity.

The location processor 211 has a primary responsibility for determining, storing, and reporting the location of the infrastructure device 201 that contains it and other terminal and/or infrastructure devices when necessary and possible. The location processor 211 may be able to autonomously determine its own location via the stand-alone location module, using GPS or other techniques described above. In the more general case, the location processor 211 may communicate with other network devices to determine its own location and the location of other devices.

As mentioned previously, the location of the infrastructure device 201 may be needed in a scenario where the infrastructure device 201 is semi-statically located, and is occasionally moved. Such a device is not typically operated while being moved as with a mobile device. Rather, the semi-static infrastructure device 201 would likely be unplugged and turned off when moved.

The location calculation engine 212 may be a combination of hardware, firmware, and/or software that processes all location-related data to provide, or indicate the inability to provide, location coordinates. The location parameter database 214 is a set of memory locations that hold raw and processed data related to the location calculations.

The messaging interface 213 may handle the communication among network 200 elements, for example, between an infrastructure device 201 and terminal device 220. The messages may be for signaling and control, may contain location coordinates such as GPS coordinates, or may contain the results of intermediate computations such as relative distance or measurement accuracy estimates. The messaging interface 213 may use other assets such as cellular, WiFi, Bluetooth or other communication standards implemented among the network entities. There are numerous formats that can be used to package and exchange data messages between devices (for example SMS, text messages, cellular packet connections).

The radio interface 215 may provide a connection to received radio signals used where interfaces to a radio that is dedicated to a location function or shared among other functions in the device. In the case of a beacon, transmitting a radio signal may be part of the location processor 211 functions. The transmitting radio may be dedicated to the beacon or shared among other functions in the device. If required, the radio interface 215 provides the connection to the transmitted radio signals.

Figure 3:
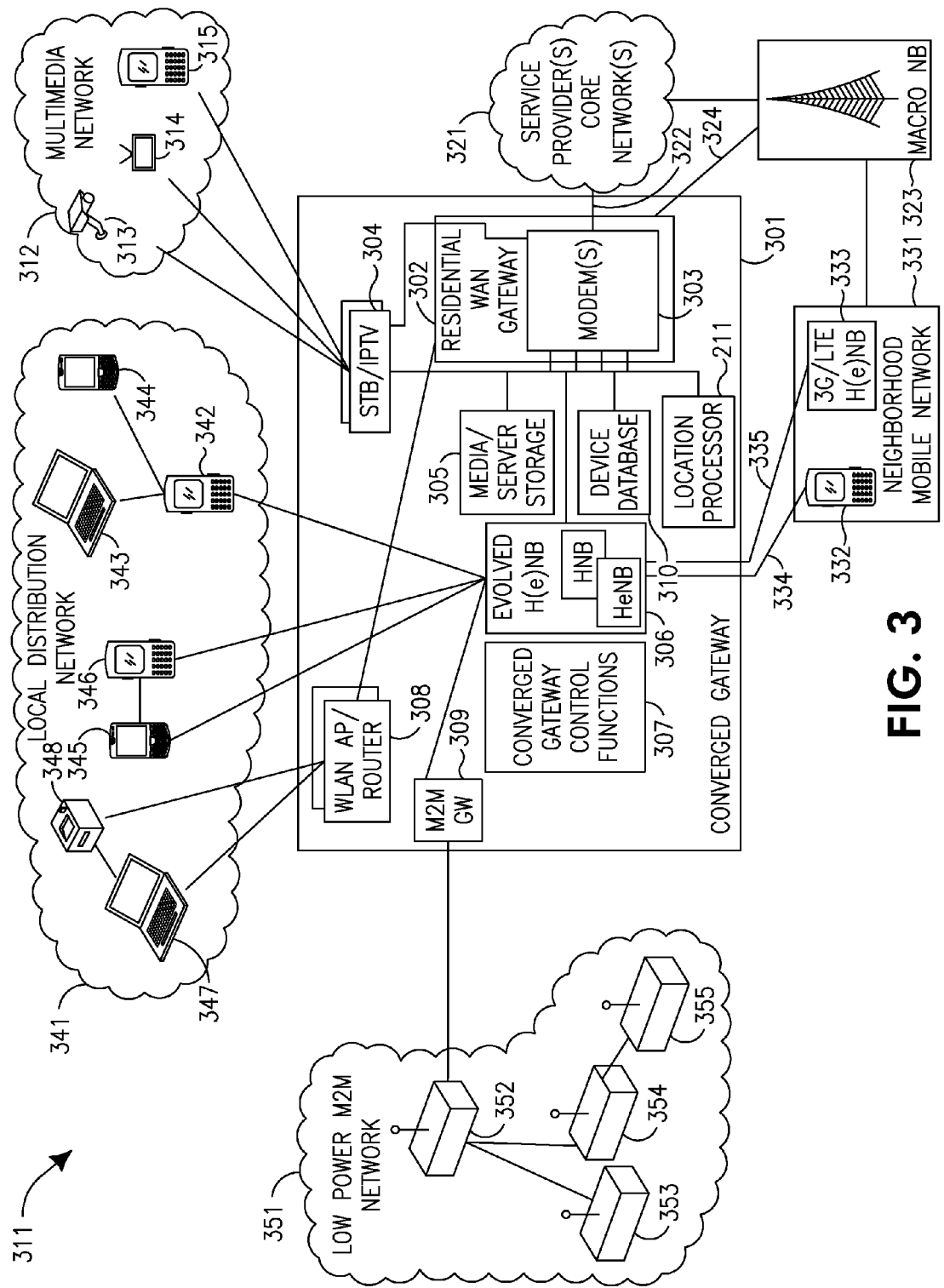
FIG. 3 shows an example block diagram of converged gateway implementation of the infrastructure device shown in FIG. 2.

FIG. 3 shows an integrated home network 311 that communicates with the service provider network 321 and a neighborhood network 331. The home network 311 implements a converged gateway (CGW) 301 as the infrastructure device 201 of FIG. 2. The location processor 211 may determine the location of the CGW 301 or the location of devices associated with the CGW 301, shown in the surrounding networks 312, 331, 341, 351, and 371. A Home Node B (HNB) or Home enhanced Node B (HeNB) 306, which may be configured as a femto cell base station, is one part of the CGW 301 architecture. The Location Processor 211 may be added to the HNB, HeNB 306 as an additional location processor, or alternatively installed directly into the HNB, HeNB 306. The HNB, HeNB 306 may also connect with outside neighborhood mobile network 331 via interfaces 334, 335 to a terminal device 332 or another HeNB 333. Yet another example network that may be connected to the HNB, HeNB 306 is a low power M2M network 351, connected via an M2M gateway 309 in the CGW 301. The low power M2M network 351 may include an infrastructure device 352 that provides access to a network of devices 353, 354, 355. A local distribution network 341 is also shown as another example network connected to the CGW 301, where a printer 348 and personal computer 347 are wirelessly connected via a WLAN AP/router 308, which in turn is connected to the residential WAN gateway 302. Terminal devices 345 are interconnected and receive access to the service provider network via the HNB, HeNB 306. Within the local distribution network 341 is a WTRU that acts as an elected AP 342, to connect terminal devices 343 and 344. Finally, a multimedia network 312 is shown, in which a camera 313 may be connected to the HNB HeNB 306, and multimedia devices 314, 315 may be connected through STB/IPTV unit 304.

The CGW 301 also may include a media server/storage unit 305 for buffering data from various media servers. A device database 310 tracks terminal devices, associated parameters and connectivity information of any associated terminal devices.

One or more modems 303 reside in a residential WAN gateway 302, each modem 303 configured for a specific wired or wireless interface 322 with service provider core networks 321, and interface 324 with a macro NB 323.

Figure 4:
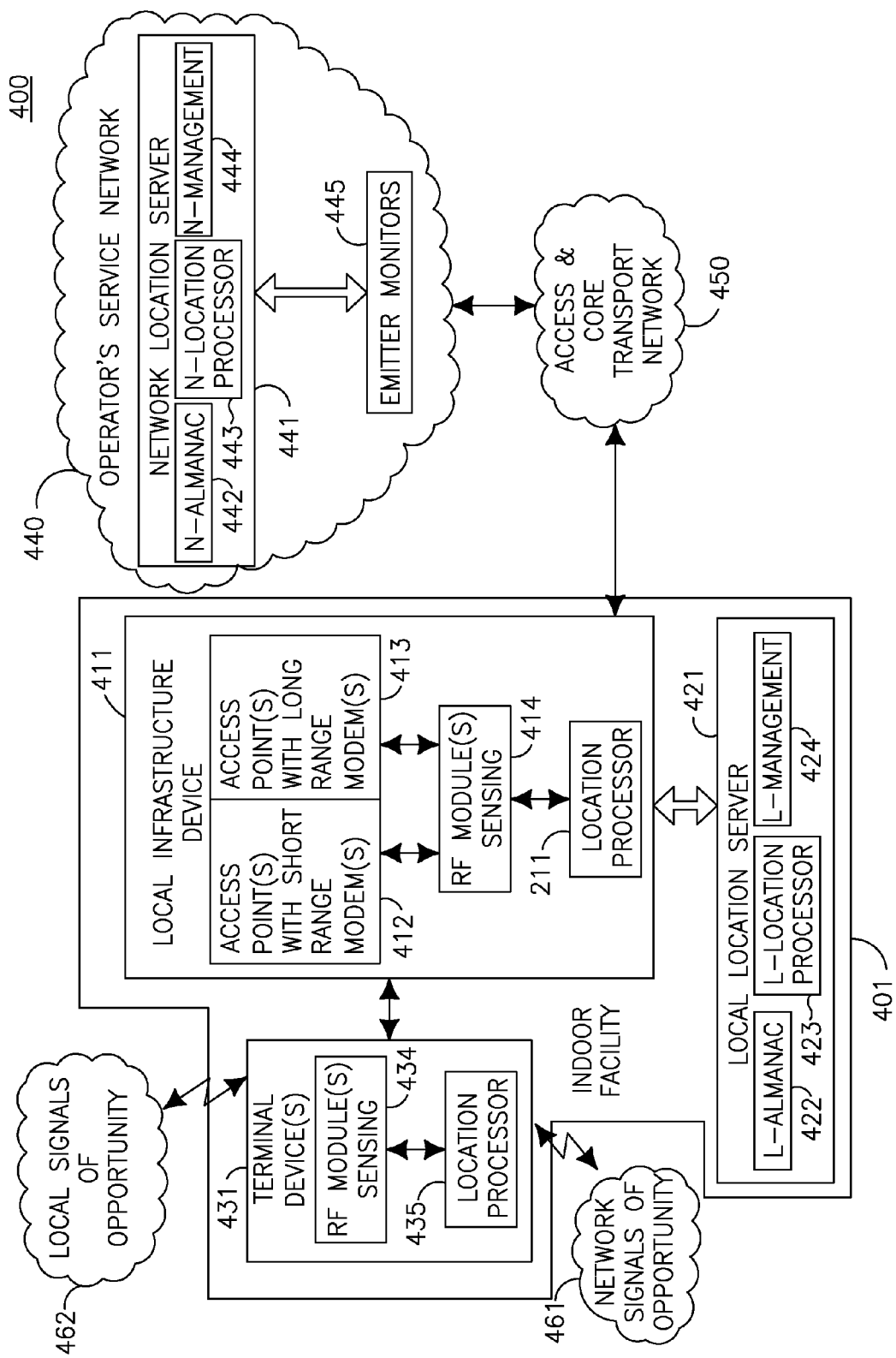
FIG. 4 shows an example block diagram of hybrid configuration for location determination of the infrastructure device or a terminal device.

FIG. 4 shows a hybrid configuration 400 for implementing a location determination method. A local infrastructure device 411 with the location processor 211 is located in an indoor facility 401, such as a home, a mall, a multi-resident-dwelling or an enterprise building. Terminal devices 431 are also located within the indoor facility 401. Examples of such terminal devices 431 include wireless phones, wireless digital image and video cameras, wireless laptops and other computing devices such as netbooks, tablet computers, e-Books etc, wireless gaming devices, wireless media players (e.g., iPods), wireless sensors (e.g., motion Detectors), and appliances equipped with wireless modems.

The local infrastructure device 411 and the terminal devices 431 have RF receivers within RF modules/sensing devices 414, 434, respectively. One approach for the RF modules/sensing devices 414, 434 is to have a dedicated radio for each wireless standard (e.g., cellular, Wi-Fi, Bluetooth) that may also provide the RF circuitry required for sensing. An alternative approach is to have a wideband, multimode multichannel radio that may be used for multiple standards and also provide the RF circuitry required for sensing. Another alternative approach is to use one or more RF receiver modules dedicated to the sensing function. The local infrastructure device 411 and/or the terminal devices 431 may be characterized as a "whitespace device" if the whitespace spectrum as designated by the FCC is used. Shown as integrated with the RF modules 414, 434 are sensing receivers configured to scan and detect available bands in the white space spectrum by identifying other emitters and providing input data to algorithms and systems that control or allocate use of white space spectrum, or that may aide in management and allocation of current licensed or unlicensed spectrum. Alternatively, the RF radio modules and white space sensing receivers may be implemented as separate units in the infrastructure device 411 and terminal devices 431. Alternatively, the white space receiver may additionally have access to a geolocation database.

As a multimode transceiver, the RF modules 414, 434 may efficiently search the RF spectrum as follows. For example, location processor 211 may query the RF modules 414, 434 to measure a certain portion of the spectrum and provide the measured signals back for further processing. By repeating this process across multiple frequencies, the location processor 211 can obtain the results of effectively scanning a wide range of frequencies. This process can be made even more efficient in cases where the location processor 211 has a priori knowledge of where to expect the signals of interest. In such a case, the RF scanning can be performed in a targeted manner, scanning only the a priori known frequencies of interest and avoid the computational complexity and associated power dissipation and latencies incurred in scanning a wide band of the spectrum.

A local location server 421 may be used as an alternative to location processors 211, 435, or in addition to the location processors 211, 435, for storing and collecting information provided to it by the terminal devices 431 or infrastructure device 411. The location server 421 may build a database of information as L-almanac 422 that can then be used by those devices. The L-almanac 422 contains data that helps the terminal devices 431 and infrastructure device 411 to know where to scan/sense and may contain location data for a transmitter of temporary signals of opportunity. The L-location processor 423 may perform functions similar to the location processor 211 as described above. An L-management application 424 may be used to controls the location process and initiate requests for location data from the surrounding networks 440, 450. The sensing data comes from the RF sensing modules in each separate network entity.

Another location server is shown as a network location server 441, which in similar fashion, may operate using an N-almanac 442 for database storage of location data, an N-location processor 443, and an N-management application 444 for exchanging location data with other network entities. The local location server 421 and the network location server may collect and store data provided by the location processors 211, 435.

Figure 5:
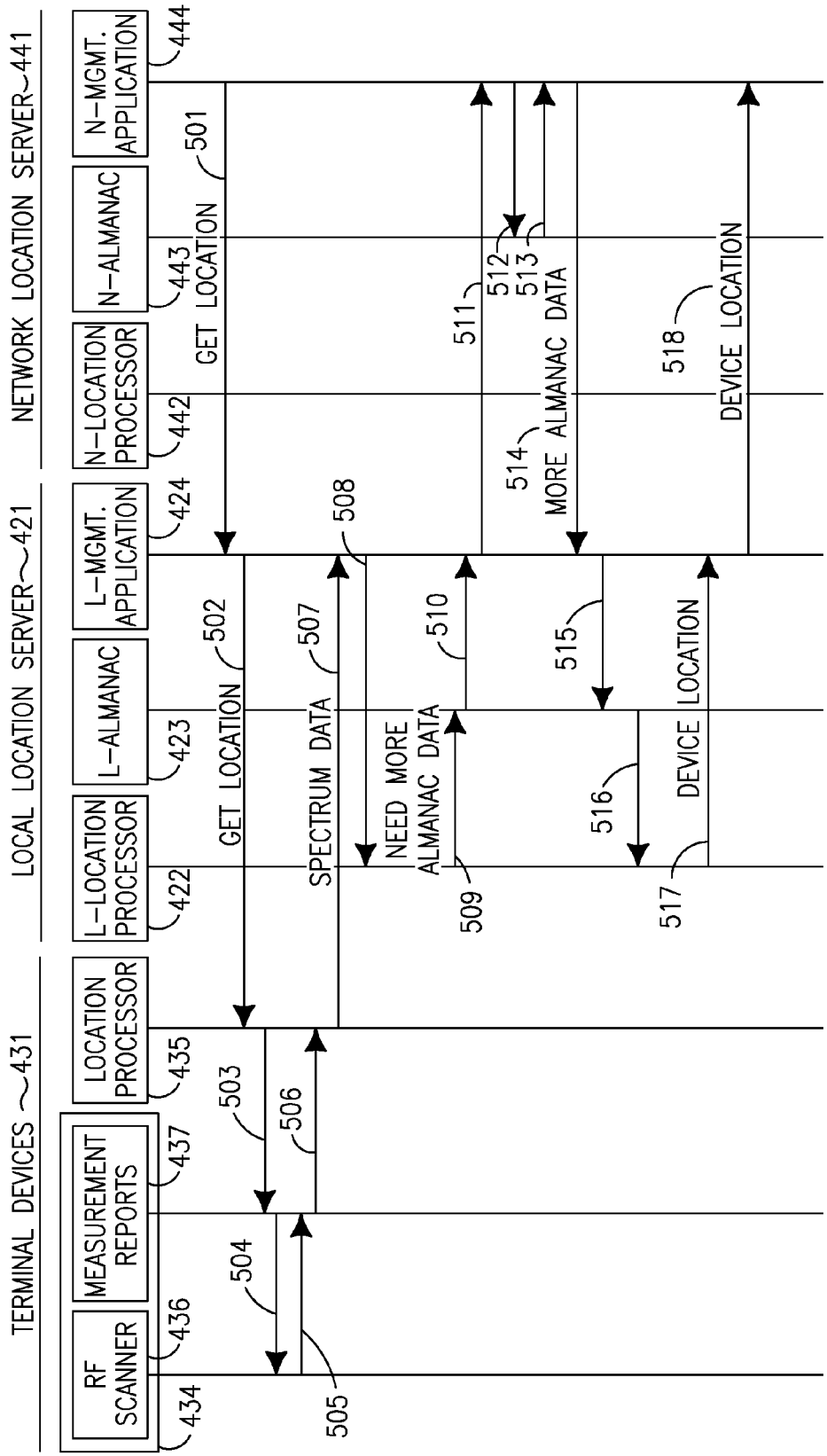
FIG. 5 is an example signal sequence diagram for the hybrid configuration shown in FIG. 4.

FIG. 5 shows an example of a signaling method using the hybrid configuration 400, where the local location server 421 interacts with the terminal device 431 and its location processor 435, and processes location information with the network location server 441. In this example, a location determination is initiated by the network-based location server 441, and the local location server 421 obtains the location of the terminal device 431 according to a hybrid location determination technique.

As shown in FIG. 5, the network location server 441 may initiate a request for the location of the terminal device 431, by sending a Get Location signal 501 from the N-Management Application 444. The local location server 421 receives the Get Location signal 501 and forwards a Get Location signal 502 to the location processor 435 of the terminal device 431. The measurement reports application 437 and RF scanning receiver 436 each receive the Get Location signal (503, 504), which initiates an RF spectrum scan. The results of the RF scan 505 are processed by the measurement reports application 437 and the location processor 435, which compress and package the data 506, 507, and send it to the local location server 421 as spectrum data 507. The L-Management application 424 forwards the spectrum data 508 to the L-Location processor. In this example, the L-location processor 422 recognizes missing almanac data, and forwards a request 509, 510, 511 for more almanac data from the network server 441. The N-Management application 444 may send a request 512 to the N-almanac 443, and may receive a response 513 with the required location data. The local location server receives the additional almanac data 514 at the L-management application 424, populates the L-almanac 423 with the almanac data 515, and processes the almanac data 516 at the L-location processor 422. Using the spectrum data 508 enhanced by the additional almanac data 516, the L-location processor 422 derives the Device Location 517 of the terminal device 431, and sends a Device Location 518 signal to the Network location server 441 via the L-management application 424. While this example presents a network initiated location determination signal sequence for a terminal device, other variations may include a signal sequence for a local location server initiated location determination of a terminal device. In such a variation, the signal sequence would commence with the Get Location signal 502, and end with signal 516.

Alternatively, the location processor 211 could be used in place of the local location server 421, and would send and receive those signals as shown in FIG. 5.

Another possible variation includes determining the location of the terminal device 431, initiated by the terminal device 431, where the signal sequence would commence with a signal 503 to trigger the RF scan, and signal 507 would include a request to the local location server 421 for device location based on L-almanac and N-almanac data. Other signal sequences are possible, such as those related, for example, to a network initiated location determination of a local infrastructure device 411 or a local infrastructure device initiated location determination of a local infrastructure device 411.

Figure 6:
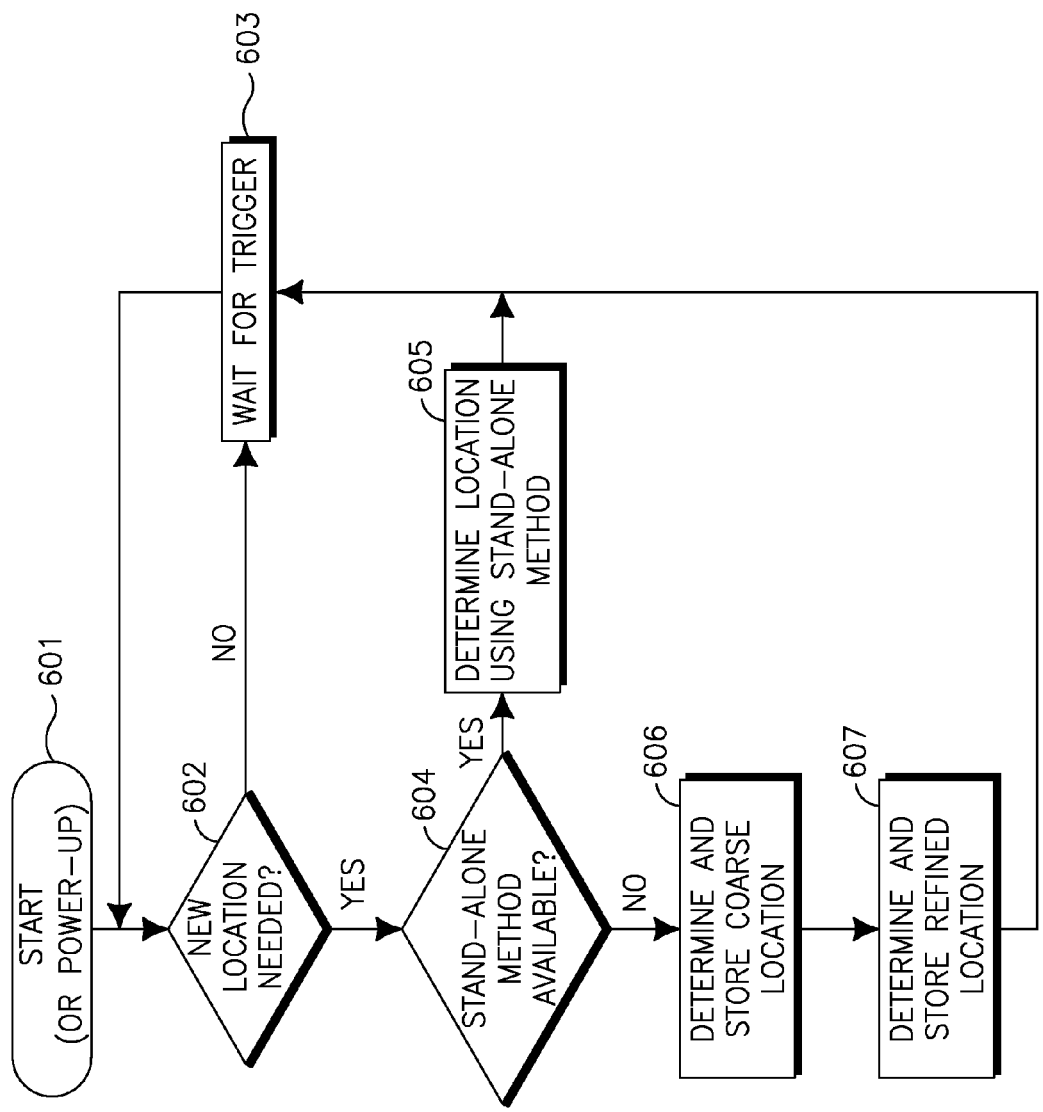
FIG. 6 shows a method flow diagram of a high level procedure for determining location of a device.

FIG. 6 is a flow diagram of a high level process that may be used by an infrastructure device 201 or terminal device 220 to determine its location. The process may also be used by a Location Processor 211 in one device, such as an infrastructure device 201, to determine the location of another device, such as a terminal device 220. Variations on this process are possible, such as changing the order of operations for example, or operations may be combined to achieve more accurate location estimates, or operations may be omitted if sufficient accuracy can be achieved without its contribution.

As shown in FIG. 6, the location method starts at 601, for example upon power up of the infrastructure device 201 or terminal device 220. At 602, the location processor 211 determines if a new location is needed. If not, the location processor 211 suspends the process at 603 until a trigger event occurs. A trigger event may include, but is not limited to, at least one of the following: the device has just been turned on, the device has just associated with the infrastructure unit, a certain amount of time has elapsed, a stand-alone method failed to provide location data as expected, a stand-alone method has location data available to improve or replace the latest location estimate, new measurements are available to refine a location estimate, the device has been moved as indicated by, for example, an inertial measurement from an accelerometer, or one or more coarse or refined location estimates show a large change in location coordinates relative to the desired location accuracy.

If a new location is needed, then at 604, the location processor checks whether a stand-alone location method is available (i.e., can the stand-alone module(s) 216 provide a reliable location, or is a location determination hindered by conditions such as insufficient signal strength due to an indoor location). If a stand-alone location method has measurements available with sufficient accuracy, the location is determined at 605 using the stand-alone location module 216, or a stand-alone indirect location determination via the messaging interface 213. The location processor 211 may then accept the measurement from the stand-alone method. If the stand-alone method only signaled availability or capability to perform a measurement, the location processor 211 may query or command it to compute and/or provide the data. Failure to provide location data or sufficiently accurate location data may be a trigger 603.

If the stand-alone method is determined to not be available at 604, the location processor 211 determines a coarse location at 606 using the location calculation engine 212, the messaging interface 213 and/or the radio interface 215, and stores the coarse location in the location parameter database 214.

A coarse location is a set of approximate location coordinates that do not meet the required accuracy, timeliness, or authentication. A coarse location estimate will have fewer, or less stringent, acceptance criteria than a refined estimate. During this step, the location processor in the infrastructure device 211, the local processor in the terminal device 435, or the L-location processor 423 in the location server 423, or the N-location processor 443 in the network location server 441 determines one or more sets of coarse location coordinates and stores the result or provides the result to the location processor that will do a combined location calculation.

A coarse location estimate may be performed according to one or more of the following techniques. One or more device users may enter an address in the device to be located. Location coordinates may be provided by a nearby device where there is no sufficiently accurate way to estimate relative location to the device to be located. For example, a mobile terminal device 220 that has a GPS module and is associated with an infrastructure device 201 (and thereby considered to be nearby) may perform location determination from a current or recently provided GPS reading. The mobile terminal 220 sends its most recent coordinates to the infrastructure device 201 regardless if there is no way to determine a relative position of the mobile terminal 220 to the infrastructure device 201, it does provide valuable information about the general location. The accuracy of the infrastructure device 201 location estimate may be estimated by the coverage area of the association with the mobile terminal 220 coupled with the time at which the GPS coordinates were computed. Another technique may include using location coordinates, or data used to estimate location coordinates, provided by one or more devices that are not trusted.

Another technique to estimate a coarse location may be to provide information to an operator's network identifying mobile devices that are associated with the infrastructure device 201, for example, encrypted or unencrypted IMSI or IMEI values. The operator's network may then look up an address or other location data associated with the mobile device subscription or service agreement that may be used as coarse location data. The operator may further process the mobile device identity to correlate it with the owner of the infrastructure device, which may be useful, for example, to confirm an address typed in by a user. A cell location or other hybrid techniques may also be used to determine the coarse location estimate. Cumulative coarse location data collected from one or more sources over a certain time duration may eventually be processed to provide a location acceptable by the location processor 211.

At 607, the location processor determines and stores a refined location. A refined location estimate meets the required accuracy and authentication requirements. Location coordinates that meet a system requirement using, for example, one or more of predetermined criteria may be called a "refined estimate." During this step, the location server 421 or location processor 211, 435 determines one or more sets of refined location coordinates and stores the result. Each system will have a set of conditions necessary to accept location coordinates as valid. Quantitative accuracy requirements, such as rms error in meters may be specified. Other accuracy requirements, possibly tied to a particular deployment may also be specified such as room level accuracy for terminal in a home or office building, or address-level accuracy for a building.

A system may determine a refined estimate using a stand-alone method that provides accurate, timely, and authenticated coordinates, or a combination of techniques that together provide accurate, timely, and authenticated coordinates. For example, a set of data may be taken by a trusted mobile terminal at a sufficiently diverse set of locations and may be accepted as an authenticated data set that leads to a refined location estimate. Alternatively, a set of data provided by a combination of mobile and fixed devices, possible some dedicated beacon devices, may be accepted as an authenticated data set that leads to a refined location estimate. A straightforward approach is to trust data from a device that is associated with a trusted network, such as a cellular system.

The predetermined criteria for a refined location estimate include, but are not limited to, at least one of the following: (1) the estimated location accuracy meeting system requirements; (2) the location coordinates, or data used to compute the coordinates, is recent (e.g., within the last hour, day, week, or other heuristic criteria; for a mobile device, consideration is given to an estimated, or maximum, velocity); (3) the device has not moved significantly since the previous measurement (as determined, for example, by accelerometers or other methods to detect motion); (4) the device has been powered on continuously (i.e., a device that is turned off could have been be relocated); or (5) an authenticated source provides the location coordinates, or data used to compute the coordinates (i.e., authentication insures accuracy and to avoid rogue behavior, such as a user falsely entering an acceptable address after the device has been moved to an unauthorized location, or leaving the address unchanged from the previous location).

In a scenario where indoor devices cannot detect enough typical signals of opportunity (fixed emitters such as cell towers, television towers, etc.), "temporary" signals of opportunity may be exploited. These temporary signals may include mobile devices whose locations have already been determined by the network (or can be provided to the network), and whose transmissions can be detected by the device. Such transmissions may be a source of coarse and refined location data.

Figure 7A:
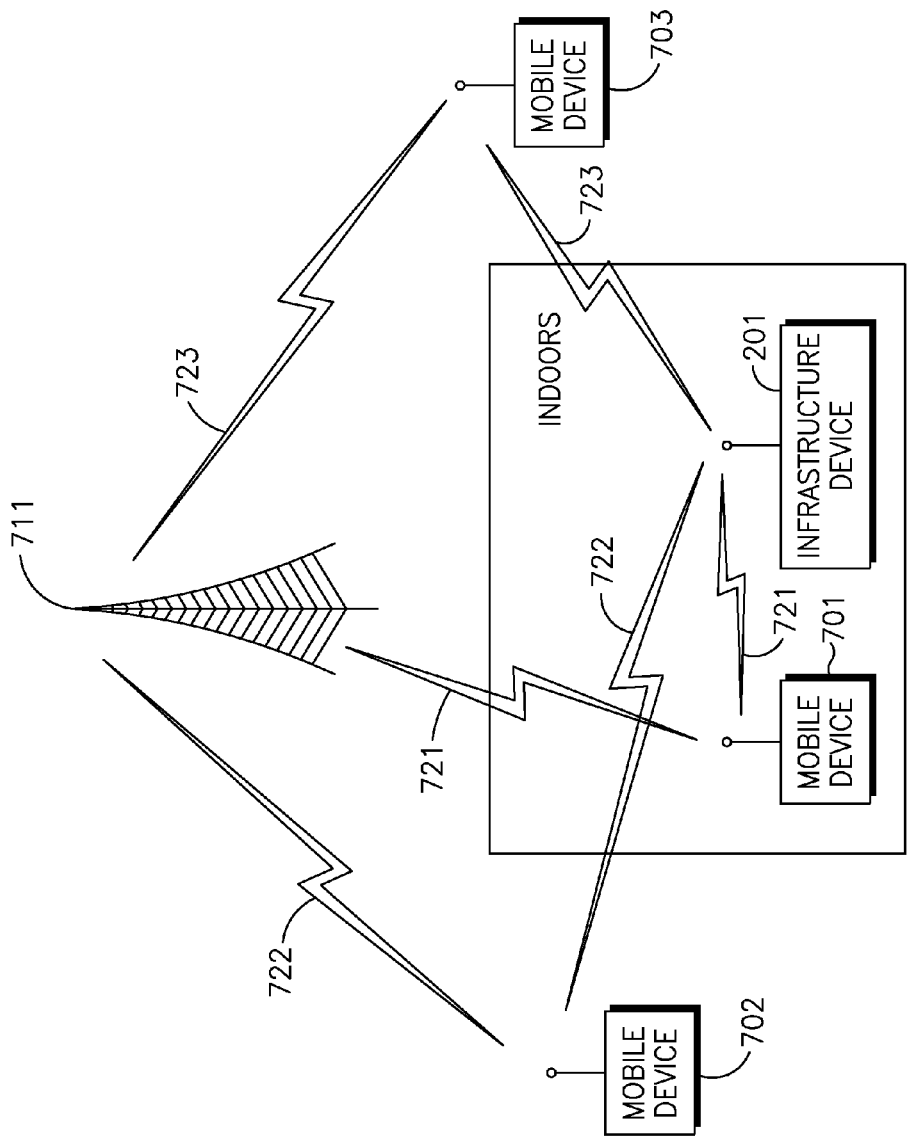
FIG. 7A shows an example block diagram of a network configuration to determine a device location based on temporary signals of opportunity.

FIG. 7A shows an example configuration of the infrastructure device 201 in communication with an indoor mobile device 701 and two outdoor mobile devices 702, 703, each mobile device receiving fixed signals of opportunity from an outdoor source 711 with a fixed location. The infrastructure device 201 may not conventionally have functionality to receive the RF frequencies from an outdoor source 711 such as a cell site, as would a terminal device such as a WTRU 102 when selecting an appropriate cell. However, in this example, infrastructure device 201 may include a femto access point (FAP) that is configured with a network listen functionality and used for interference management functions, such as management by the system operator. The network listen function scans and detects signals 721, 722, and 723 which are temporary signals of opportunity, and may provide the infrastructure device 201 additional data as input to the location processor 211. In order to do this, the RF scanning range of the network listen function may be extended and/or the network listen function may be commanded by the location processor 211 to 'listen on demand' and report the results back.

Figure 7B:
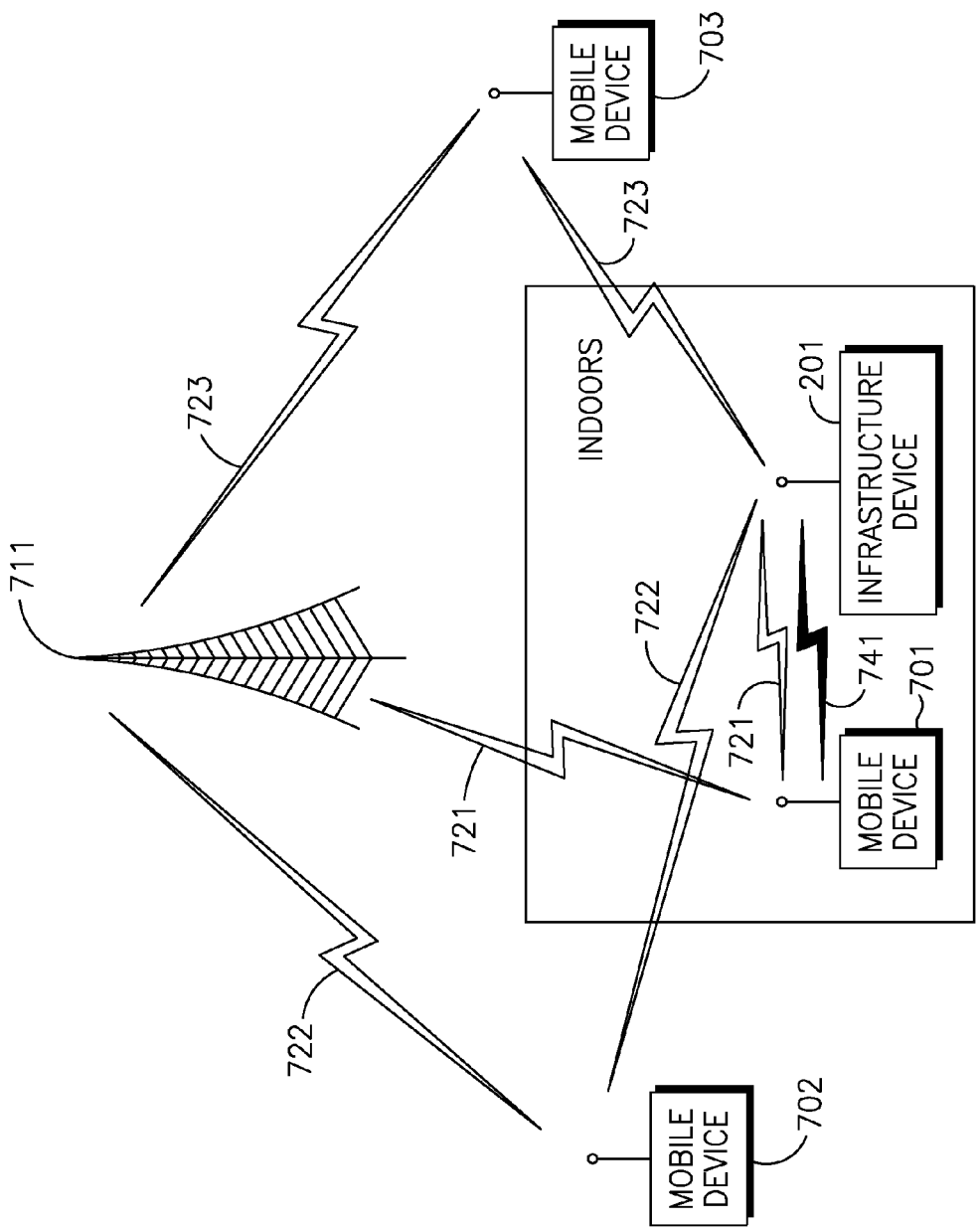
FIG. 7B shows a variation of the example configuration shown in FIG. 7A, which additionally implements a low-power beacon signal from a terminal device.

FIG. 7B shows a variation of the configuration shown in FIG. 7A. To enhance the use of "temporary" signals of opportunity, a mobile device can be outfitted to emit an intermittent, low-power beacon (or "whisper beacon") 741 that is used to increase the available signals of opportunity to the infrastructure device 201. The location processor 211, in conjunction with the network, can selectively schedule mobile devices to emit the whisper beacon.

Next described are several examples of implementing the location method 600. In a first example procedure for the infrastructure device 201 to determine its location using available access to GPS data either via an internal unit 216, or a unit connected to it in some fashion, where the GPS is able to establish a location fix. This can be a result of favorable placement of the CGW with a fully internal GPS unit and antenna, an internal GPS unit with favorable placement of an external antenna, or an external GPS module and antenna with favorable placement that is attached to the CGW. The infrastructure device 201 may maintain a database of information on location data, an example of which is shown in Table 1.

TABLE 1

Example of a database containing location data

| Source | Source Category | Accuracy Category | Time of Measurement | Source Location Estimate | | | Source Accuracy Estimate | | | Location Offset (m) |
| --- | --- | --- | --- | --- | --- | --- | --- | --- | --- | --- |
| | | | | Lat | Long | Elev | Lat | Long | Elev | |
| GPS | Internal | 1 | 3/5/2010 18:00 | 40.7934322 | −73.4151214 | 225 | 5.2 | 6.3 | 24.7 | 0 |
| GPS | Internal | 1 | 3/5/2010 12:00 | 40.7934322 | −73.4151214 | 225 | 4.3 | 4.8 | 46.2 | 0 |
| GPS | Internal | 1 | 3/5/2010 06:00 | 40.7934322 | −73.4151214 | 225 | 7.3 | 3.2 | 16.8 | 0 |
| GPS | Internal | 1 | 3/5/2010 00:00 | 40.7934322 | −73.4151214 | 225 | 3.2 | 8.3 | 64 | 0 |

As shown in Table 1, the Source of the location estimate is indicated as "GPS". The Source Category provides further information on the source (e.g., "Internal" may indicate that the GPS source is an internal GPS unit). An accuracy category in this example is mapped to the range 1-10 where 1 indicates the most accurate and 10 the poorest. Other mappings using larger or smaller ranges to provide other resolutions can be used. Time of Measurement data reflects the time at which the measurement data was provided. In this example, a measurement was made every six hours, which could be based on, for example, a trigger criterion.

The Source Location Estimate indicates location coordinates provided by the source. In this example, the source is the device to be located. Alternatively, it may be the location coordinates of a device that is assisting in the location calculation. For the cases presented here, the data is expressed as latitude, longitude, and elevation with fractional parts. Other geographic coordinate systems may be used such as latitude, longitude, and elevation with degrees, minutes, and seconds or Cartesian coordinates (x,y,z).

The Source Accuracy Estimate indicates the accuracy of the source location data, if available. For example, an estimate of the measurement standard deviation or other quantitative value may be provided and recorded for each coordinate as shown by the numbers entered in the table. Alternatively, a composite quantitative number may be provided and recorded for the overall set of coordinates. For example, one standard deviation value, a circular error probability, or spherical error probability may be provided. Another alternative is to provide a qualitative entry. In examples below, there are text entries "U-Addr" and "V-Addr" indicating a user-provided address and a validated address.

The Location Offset data indicates an estimate of the distance between the source of the measurement and the device, if the source is not internal to the device to be located. As will be presented in later examples below, this may be a quantitative or qualitative value. For the use case being presented here, the entry is 0 (zero), indicating that the coordinates provided are estimates of the actual device location. For the case of an external GPS unit and/or antenna, the location offset may be upper bounded by the cable length for example.

The next example of a location determination implementation is related to an infrastructure device 201 using external data to establish an approximate location. In this case, there are terminal devices that associate with the infrastructure device 201 that can provide their GPS coordinates. Note that such a system is within the capability of many existing terminal devices that include GPS or A-GPS and can signal the location data to another device.

Table 2 is an example of a database for this use case. The most recent data is entered at the top row and the older data is pushed down.

location offset is 0 since the data, to the extent trusted, represents the address of the infrastructure device 201.

A few minutes later a terminal identified as <terminal id #1> associates with the infrastructure device 201, and is entered in the source column. At some time previously, the GPS in this terminal determined a location and signaled the coordinates to the infrastructure device 201. The source category entered in Table 2 is "Assoc Device—NRT", which indicates that the data came from an associated device as a non-real time measurement. The accuracy category is set to 1 (best accuracy) since it is a GPS measurement. The time, location coordinates, and accuracy estimate are entered in the table. Since there is no means to determine how far the terminal is from the infrastructure device 201, the location offset is indicated as "Local." Assuming the terminal is a device trusted by a wireless operator, and perhaps has been authenticated by the wireless network, this may be considered a trusted piece of data. It may not provide the accurate location data needed, but the infrastructure device 201 now has an address entered by the user and some trusted GPS coordinates that very likely represents a nearby location. A set of data that can be used to validate the address is being accumulated.

In the third row up, the process is repeated with another terminal designated as "<terminal id #2>." In the next sequence of rows, over the course of time, the GPS units in the two terminals manage to generate a sequence of measurements that are transferred to the infrastructure device 201 and indicated as real-time, "Assoc Device—RT." This could happen, for example, as the people with the phone move about the area to places where the GPS can achieve a position fix—perhaps outside, perhaps near a window.

TABLE 2

Location database where external data establishes approximate location

| Source | Source Category | Accuracy Category | Time of Measurement | Source Location Estimate | | | Source Accuracy Estimate | | | Location Offset (m) |
|---|---|---|---|---|---|---|---|---|---|---|
| | | | | Lat | Long | Elev | Lat | Long | Elev | |
| Fusion | Internal | 7 | 3/5/2010 10:30 AM | 40.7934334 | −73.415133 | 217 | V-Addr | V-Addr | V-Addr | 0 |
| <terminal id #2> | Assoc Device - RT | 1 | 3/5/2010 10:29 AM | 40.7933961 | −73.4150283 | 124 | 12.6 | 6.2 | 54.2 | Local |
| <terminal id #2> | Assoc Device - RT | 1 | 3/5/2010 10:03 AM | 40.7934421 | −73.4150002 | 101 | 14.8 | 8.2 | 12.0 | Local |
| <terminal id #1> | Assoc Device - RT | 1 | 3/5/2010 9:42 AM | 40.7934992 | −73.4153972 | 319 | 2.8 | 9.9 | 27.3 | Local |
| <terminal id #2> | Assoc Device - RT | 1 | 3/5/2010 9:27 AM | 40.7939991 | −73.4151119 | 86 | 7.1 | 19.2 | 14.0 | Local |
| <terminal id #1> | Assoc Device - RT | 1 | 3/5/2010 9:14 AM | 40.7934112 | −73.4159932 | 193 | 12.0 | 6.1 | 23.7 | Local |
| <terminal id #2> | Assoc Device - NRT | 1 | 3/5/2010 9:07 AM | 40.7934991 | −73.4159956 | 202 | 5.9 | 2.9 | 45.2 | Local |
| <terminal id #1> | Assoc Device - NRT | 1 | 3/5/2010 9:06 AM | 40.7934226 | −73.4158981 | 257 | 7.6 | 2.9 | 14.0 | Local |
| User Input | Manual | 10 | 3/5/2010 9:00 AM | 40.7934322 | −73.4150238 | na | U-Addr | U-Addr | U-Addr | 0 |

Beginning with the bottom row in Table 2, a user may manually enter an address, possibly via a computer connected to the infrastructure device 201 as part of a set-up/installation process. If it is assumed that the purchaser or end user is doing this installation, as opposed to a representative of a wireless operator, the address data may be correct in most cases but may not be considered authenticated. The source entry is denoted "User Input," the source category is "Manual," and the accuracy category is set to the 10, the least accurate category, indicating that there is little trusted accuracy to this data. The measurement time and location coordinates are entered, with "na" (not applicable) entered in the elevation column since an address is a two-dimensional location. The source accuracy estimate is entered as "U-Addr," an abbreviation for "Unvalidated Address," also indicating that the address data is available but not trusted or validated. The At the top entry, the logic and policy in the location processor 211 decides it has enough data to validate the address. For example, suppose all or most of the GPS coordinates represent locations in a small area around the address entered by the user that uniquely establishes a street address. If the terminals are trusted, this would establish with high confidence the address at which the infrastructure device 201 is being used. The table entry indicates the source as "Fusion," meaning the combination of a group of measurements, and the improved accuracy category of 7. The coordinates computed from the user-entered address are accepted and entered, the source accuracy is indicated as "V-Addr" for "Validated Address" and the location offset as 0 since the address represents the location of the infrastructure device 201.

In the next implementation example, the infrastructure device 201 uses external data with location offsets to establish its approximate location. This use case is similar to the previous example, except now there is an additional set of information available that allows the infrastructure device 201 to determine the distance (or location offset) to the mobile terminals each time a set of GPS coordinates are provided. There are many techniques for relative ranging known to those skilled in the art. However, such techniques typically require either common precise time or round trip signaling procedures with precisely controlled response times. Hence such a capability would need to be built into both the terminal and infrastructure device 201.

Table 3 shows a database similar to that in Table 2 except now there are numerical entries in the location offset column each time an associated terminal device provides its coordinates. It is well known that a sufficient set of distances from known reference points is sufficient to compute an unknown location (e.g., at least three non-colinear points for a two dimensional location and at least a fourth non-coplanar points for a three dimensional location). Hence the infrastructure device 201 can now compute its location as shown in the top row. The accuracy is still shown as "V-Addr" assuming the validated address is the desired data; however, a numerical accuracy estimate may also be calculated.

dedicated specifically for the location process. The beacon may alternatively be a standard transmission from the terminal device such as a sequence of WiFi packets, a Bluetooth signal, a cellular uplink transmission, or other wireless format that may be available. The advantage of the latter approach is that no new capability needs to be implemented in a terminal device, other than perhaps software that activates a transmission of an existing wireless signal structure.

The beacon will be used by the infrastructure device 201 to determine relative location from one or more reference locations established when the stand-alone method provided the terminal device's coordinates. It is well known that relative position of a device can be determined by monitoring an emitted signal by, for example, tracking the phase of the carrier or other features such as chip rate, bit rate, or symbol rate. For example, suppose a terminal provides coordinates of several reference locations but later moves indoors and can no longer do so. Further suppose the infrastructure device 201 monitored a beacon from the terminal device and can compute the distance from the now-unknown terminal position to each of the previous reference points. If a sufficient number of

TABLE 3

Location database where external data with location offsets establishes approximate location

| Source | Source Category | Accuracy Category | Time of Measurement | Source Location Estimate | | | Source Accuracy Estimate | | | Location Offset (m) |
| --- | --- | --- | --- | --- | --- | --- | --- | --- | --- | --- |
| | | | | Lat | Long | Elev | Lat | Long | Elev | |
| Fusion | Internal | 5 | 3/5/2010 10:30 AM | Computed lat, long & elev | | | V-Addr | V-Addr | V-Addr | 0 |
| <terminal id #2> | Assoc Device - RT | 1 | 3/5/2010 10:29 AM | 40.7933961 | −73.4150283 | 124 | 12.6 | 6.2 | 54.2 | 100.632 |
| <terminal id #2> | Assoc Device - RT | 1 | 3/5/2010 10:03 AM | 40.7934421 | −73.4150002 | 101 | 14.8 | 8.2 | 12.0 | 50.112 |
| <terminal id #1> | Assoc Device - RT | 1 | 3/5/2010 9:42 AM | 40.7934992 | −73.4153972 | 319 | 2.8 | 9.9 | 27.3 | 6.002 |
| <terminal id #2> | Assoc Device - RT | 1 | 3/5/2010 9:27 AM | 40.7939991 | −73.4151119 | 86 | 7.1 | 19.2 | 14.0 | 15.159 |
| <terminal id #1> | Assoc Device - RT | 1 | 3/5/2010 9:14 AM | 40.7934112 | −73.4159932 | 193 | 12.0 | 6.1 | 23.7 | 12.775 |
| <terminal id #2> | Assoc Device - NRT | 1 | 3/5/2010 9:07 AM | 40.7934991 | −73.4159956 | 202 | 5.9 | 2.9 | 45.2 | Local |
| <terminal id #1> | Assoc Device - NRT | 1 | 3/5/2010 9:06 AM | 40.7934226 | −73.4158981 | 257 | 7.6 | 2.9 | 14.0 | Local |
| User Input | Manual | 10 | 3/5/2010 9:00 AM | 40.7934322 | −73.4150238 | na | U-Addr | U-Addr | U-Addr | 0 |

Next described is an embodiment in which the location of an associated terminal device is to be determined by the infrastructure device 201. The associated terminal devices may have one or more of the stand-alone technologies described above that can provide location coordinates. If a terminal device is so-equipped and situated where the required signals can be received and processed to determine a location fix, then the infrastructure device 201 can maintain a database of terminal locations by simply implementing a protocol where the coordinates are signaled from the terminal to the infrastructure device 201.

Terminal devices that have GPS or A-GPS capability can provide coordinates in many situations; however, many of the other stand-alone techniques described above are not widely deployed and may add size, cost, and power to a terminal device which would make alternative methods desirable.

In the present example, the terminal device has a GPS or A-GPS capability available to establish a set of reference locations. Subsequently, the terminal device moves to an area (i.e., interior of a building) where the stand-alone capability can no longer provide coordinates so an infrastructure device such as the infrastructure device 201 aides in the process.

The terminal device in the present example also is configured with a capability to emit a signal that will be called a beacon, such as the whisper beacon 741 described earlier, reference points have been provided, the unknown position can then be computed by the location processor 211.

In contrast to simply relying on reference locations that are fixed and known a priori, this embodiment employs signals of opportunity as beacons where the emitter is mobile device (such as mobile device 701 shown in FIG. 7) and acts as a reference signal at some times and a device to be located at other times. The terminal device may activate the beacon transmission for a fixed time period after signaling reference location coordinates to the infrastructure device 201. This would allow the infrastructure device 201 to establish an associated reference parameter for the beacon transmission, for example, a starting phase.

If a terminal location update is required, and coordinates are not available, the infrastructure device 201 may signal the terminal device to initiate a beacon transmission.

Figure 8B:
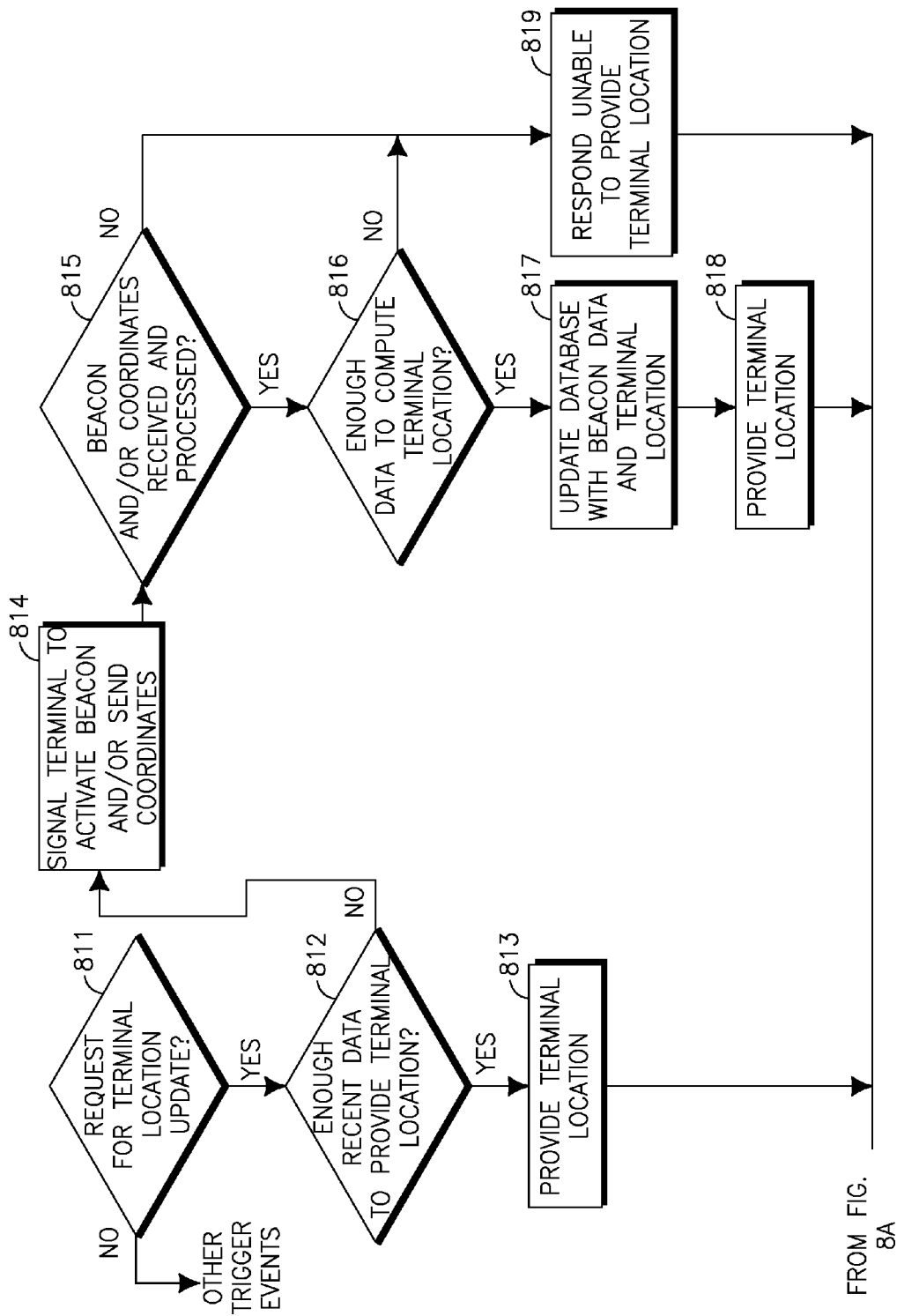

FIG. 8 is an example method flow diagram for processing at the infrastructure device 411 to implement the present embodiment, with reference to FIG. 4. The method starts at 801, possibly upon powering up of the infrastructure device 411. The location processor 211 waits for a trigger 802, and upon receiving the trigger, checks at 803 for whether new location coordinates are available. If available, location processor 211 determines wither beacon data is available at 804, and if so, location parameter database 214 and/or the local location server database (i.e., the L-almanac 422) is updated with the beacon data and the terminal location. If at 804, the beacon data is not available, the messaging interface 213 signals the terminal device 431 at 806 to activate the beacon. If the beacon is received at 807, the database 214, 422 is updated at 805. Otherwise, the method returns to step 802 to await the next trigger.

Returning to 803, if new location coordinates are not available, the location processor checks whether beacon data is available at 808. If available, the location processor 211 checks if there is enough data to compute the terminal location at 809. The database 214, 422 is updated with the beacon data if sufficient, otherwise the method returns to 802 to await the next trigger.

Returning to 808, if beacon data is not available, the location processor 211 checks if the terminal device 431 has requested a terminal location update at 811, and if so, the location processor 211 checks if there is enough recent data to provide the terminal device location at 813. Should there be insufficient data at 812, the messaging interface 213 signals the terminal device 431 to activate the beacon and/or send coordinates at 814. At 815, if the location processor receives enough data to provide the terminal device location, the database 214, 422 is updated with beacon data and terminal device location at 817, and the location is provided to the terminal device 431 at 818. If at 815 and 816, the location processor 211 determines that there is insufficient data or beacon data/coordinates were not properly received and processed, the messaging interface 213 responds to the terminal device 431 at 819 that the infrastructure device 411 is unable to presently provide terminal device location.

Figure 9:
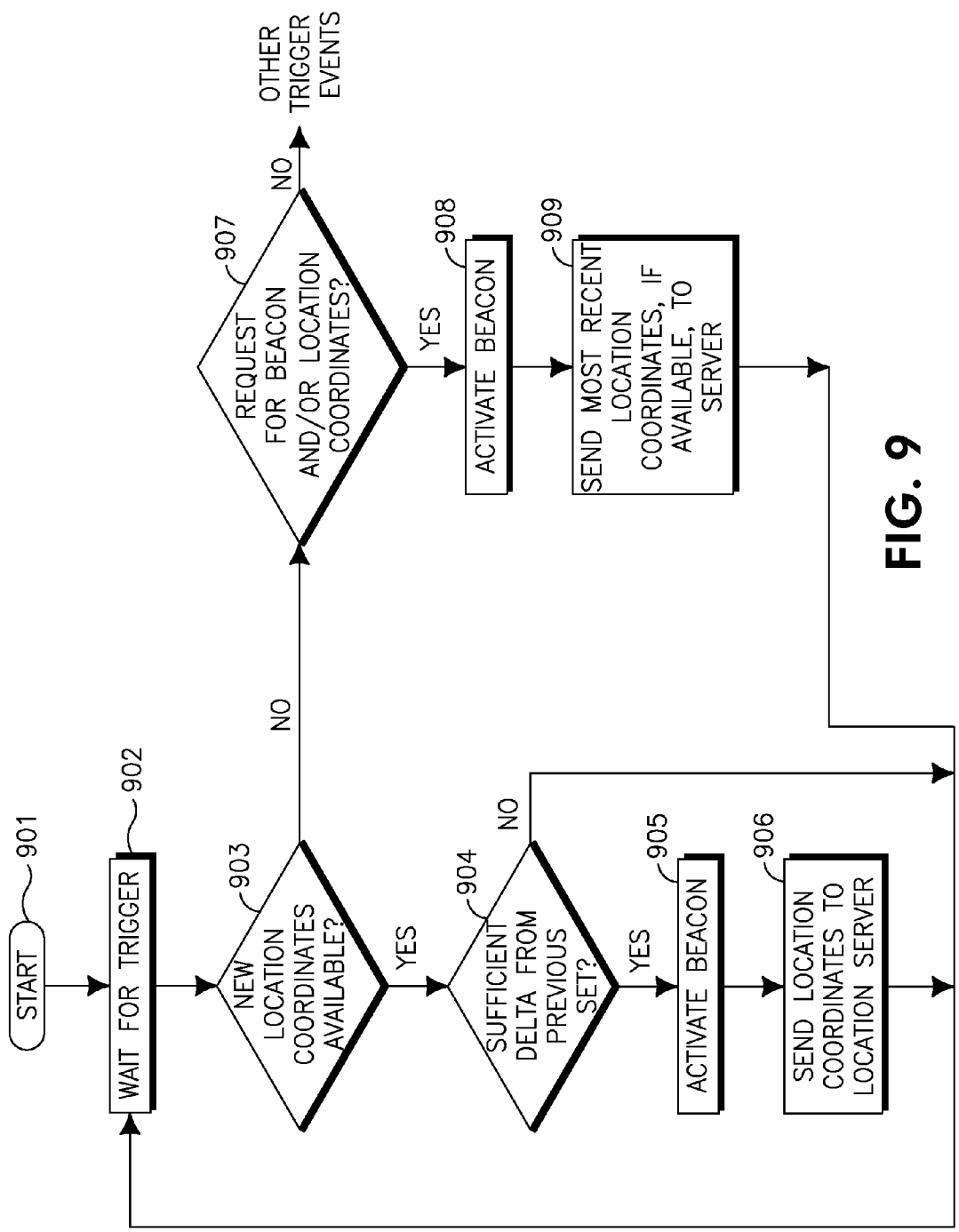
FIG. 9 is an example method flow diagram of a terminal device supporting an infrastructure device in determining the terminal device location.

FIG. 9 is an example method flow diagram for processing of the associated process at the mobile terminal device 431, with reference to FIG. 4. At 901, the method starts, possibly upon powering up of the terminal device 220. After waiting for and receiving a trigger at 902, the location processor 435 of the terminal device 431 checks if new location coordinates are available at 903. If available, the processor 435 checks at 904 whether there is sufficient change in new location compared to previous set of coordinates. If sufficient change, then the processor 435 activates the beacon 905 and sends location coordinates to the location server 421 or location processor 211 at 906. If the new location coordinates at 904 fail to reflect a sufficient location change, the method returns to 902 to wait for the next trigger.

Returning to 903, if new location coordinates are not available, the location processor 435 checks if a request for beacon and/or location coordinates was received from the infrastructure device 411 or location server 421 at 907. In response to receiving such a request, the processor 435 activates a beacon at 908 and sends the most recent location coordinates, if available, to the location processor 211 or location server 421 at 909.

Table 4 is an example of populating a database during the process. Beginning from the earliest entries at the bottom, at four different locations a terminal is able to compute and send its coordinates to the infrastructure device 201. Also at each of the four locations, the infrastructure device 201 receives and processes a beacon to establish the reference data. At the times associated with the top two entries, the terminal is unable to compute its own coordinates, but it emits the beacon, the beacon is processed by the infrastructure device 201 and used to compute the terminal location.

TABLE 4

Database for Infrastructure Device determining terminal device location

| Entry | Time | Relative location data extracted from beacon processing | Location Estimate from Terminal | | | Location Estimate at Infrastructure | | | Location Accuracy Estimate | | |
|---|---|---|---|---|---|---|---|---|---|---|---|
| | | | Lat | Long | Elev | Lat | Long | Elev | Lat | Long | Elev |
| Infrastructure Computation | 3/5/2010 10:45 AM | <Terminal beacon data set 6> | na | na | na | 40.7936445 | −73.415234 | 162 | 4.9 | 5.9 | 39.6 |
| Infrastructure Computation | 3/5/2010 10:30 AM | <Terminal beacon data set 5> | na | na | na | 40.7934334 | −73.415133 | 217 | 5.3 | 6.1 | 47.0 |
| Terminal data 4 | 3/5/2010 10:29 AM | <Terminal beacon data set 4> | 40.7933961 | −73.4150283 | 124 | 40.7933961 | −73.4150283 | 124 | 12.6 | 6.2 | 54.2 |
| Terminal data 3 | 3/5/2010 10:03 AM | <Terminal beacon data set 3> | 40.7934421 | −73.4150002 | 101 | 40.7934421 | −73.4150002 | 101 | 14.8 | 8.2 | 12.0 |
| Terminal data 2 | 3/5/2010 9:42 AM | <Terminal beacon data set 2> | 40.7934992 | −73.4153972 | 319 | 40.7934992 | −73.4153972 | 319 | 2.8 | 9.9 | 27.3 |
| Terminal data 1 | 3/5/2010 9:27 AM | <Terminal beacon data set 1> | 40.7939991 | −73.4151119 | 86 | 40.7939991 | −73.4151119 | 86 | 7.1 | 19.2 | 14.0 |

In another embodiment, a collaborative location determination is performed by multiple fixed and wireless devices which are configured with functionality to maintain connectivity or routing tables (databases). These wireless devices also implement Neighbor Discovery and Advertisement Protocols, so that the existence, availability, and capabilities of various wireless devices are made known to neighbor devices. Such advertisements may be enhanced with location information as well. Such enabled wireless devices will advertise their location and time coordinates in addition to their logical and network identity and connectivity information. These additional information elements may be added as extensions and modifications to existing IETF protocols. For 3GPP devices, location and time information can be added to the Cell Update message, allowing a device to share information using existing signaling protocols. Such advertised information may be exploited and used in any of the previously described methods for the location determination. For example, a Home Device (fixed or mobile, terminal or infrastructure device) may scan the spectrum corresponding to a particular emitter, the location processor may process the received RF signal, decode the device's location information, and use the data, for example, as in any of the methods and example cases described above. The data may also be sent to a network-based location processor.

Advertisements of wireless emitter information may cause a problem of timing. The basic problem is that wireless emitters and receivers typically attempt to conserve their power dissipation by putting their electronic circuitry in a sleep mode, waking up only on an occasional basis (regular or otherwise preprogrammed). This results in the situation that sometimes the emitter may transmit the advertisement messages at a time when the receiver is not awake (or in a listen mode). In order to ensure proper timing, a common control channel may be provided over which the intermittent devices may listen and transmit in a synchronized manner. The specific temporal details of such a channel, for example, may be obtained by a centralized common control channel server, located, for example, on the Internet and publicly available. Another solution is also a central server based, but there is no common channel. The central server contains the sleep cycle information of various transmitters and can be queried to obtain the information related to a particular emitter.

Although the above described embodiments are related to an infrastructure device that contains a location processor, any of the terminal devices in communication with the infrastructure device may implement some or all of the functions described for the infrastructure device and subsume the role of determining locations or computing intermediate results needed to determine location. Also, a local location server, and/or a network location server, may subsume the role of determining device locations.

Applications for the determined device location data, are various, including ones that that track, map, or otherwise process and/or display device locations. An application that receives much attention is the need to accurately locate cell phones and fixed line phone users such that emergency services or law enforcement (e.g., E911), can accurately direct responders to the location of the caller even if the address or location is not provided during the call or provided incorrectly. The techniques presented above can support or enhance these location requirements. The location coordinates can be provided by the device making the call. Alternatively, location coordinates can be provided by an infrastructure device that is tracking the location of the terminal making the call. Even if existing technology can provide an address, the technology presented here can enhance the information by, for example, localizing to the particular room from where the call is being made. This may be particularly important in multi-tenant dwellings, enterprises, campus buildings etc.

EMBODIMENTS

1. A method for determining a physical location of a wireless device, comprising:
   receiving at least one coarse location data from an associated device;
   storing and accumulating received coarse location data;
   determining that enough received coarse location data is received to consider the location of the infrastructure device to be accurate.
2. The method as in any of the preceding embodiments further comprising storing the location of the wireless device in a memory.
3. The method as in any of the preceding embodiments further comprising reporting the location of the device to other devices.
4. The method as in any of the preceding embodiments further comprising using a stand-alone location module to determine a location of the wireless device.
5. The method as in any of the preceding embodiments further comprising using a location calculation engine, the location calculation engine a combination of hardware, firmware, and/or software that processes all location-related data.
6. The method as in embodiment 5, wherein the location calculation engine provides location coordinates.
7. The method as in any of the preceding embodiments wherein data is stored in a location parameter database.
8. The method as in embodiment 7, wherein the location parameter database is configured to hold raw and processed data related to the location calculations.
9. The method as in any of the preceding embodiments further comprising using a messaging interface to request a location or location parameters from another device.
10. The method as in embodiment 9, wherein the messaging interface holds messages that contain location coordinates.
11. The method as in any of the preceding embodiments further comprising using a radio interface.
12. The method as in embodiment 11, wherein the radio interface is configured to provide a connection to the received radio signals.
13. The method as in any of the preceding embodiments wherein location determination is suspended until a trigger event occurs.
14. The method as in embodiment 13, wherein the trigger event occurs upon a condition that the device is turned on.
15. The method as in any of the preceding embodiments 13-14, wherein the trigger event occurs upon a condition that the device is associated with an infrastructure unit.
16. The method as in any of the preceding embodiments 13-15, wherein the trigger event occurs upon a condition that a certain amount of time has elapsed.
17. The method as in any of the preceding embodiments 13-16, wherein the trigger event occurs upon a condition that a stand-alone method failed to provide location data as expected.
18. The method as in any of the preceding embodiments 13-17, wherein the trigger event occurs upon a condition that a stand-alone method has location data available to replace the latest location estimate.
19. The method as in any of the preceding embodiments 13-18, wherein the trigger event occurs upon a condition that new measurements are available to refine a location estimate.
20. The method as in any of the preceding embodiments 13-19, wherein the trigger event occurs upon a condition that the device has been moved.
21. The method as in any of the preceding embodiments, further comprising using a location server processor to determine one or more sets of coarse location coordinates.
22. An apparatus configured to perform a method as in any one of embodiments 1-21.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method comprising:
   detecting a triggering event for determining a physical location of a wireless infrastructure device;
   responsive to detecting the triggering event, the wireless infrastructure device attempting to determine the physical location via a stand-alone location method;
   detecting a failure to determine the physical location via the stand-alone location method;
   responsive to detecting the failure to determine the physical location via the stand-alone method, determining a plurality of coarse locations of the wireless infrastructure device;
   determining a refined location estimate of the wireless infrastructure device based on the determined plurality of coarse locations of the wireless infrastructure device; and
   storing the determined refined location estimate as the physical location of the wireless infrastructure device.

2. The method of claim 1, wherein the stand-alone location method is GPS.

3. The method of claim 1, wherein the triggering event is selected from the group of triggering events consisting of the wireless infrastructure device being powered on, the wireless infrastructure device associating with a mobile device, a predetermined period of time elapsing, a new coarse location measurement being available, and the wireless infrastructure device detecting movement thereof.

4. The method of claim 1, wherein none of the coarse locations in the plurality of coarse locations satisfies a set of acceptance criteria, the set of acceptance criteria comprising required accuracy, timeliness, and authentication.

5. The method of claim 1, wherein at least one coarse location in the plurality of coarse locations is a user-entered street address of the wireless infrastructure device.

6. The method of claim 1, wherein at least one coarse location in the plurality of coarse locations is a location of an associated mobile terminal device for which the wireless infrastructure device cannot determine an accurate relative distance between itself and the mobile terminal device.

7. The method of claim 1, wherein at least one coarse location in the plurality of coarse locations is determined by:
   the wireless infrastructure device transmitting a schedule to an associated mobile device, the schedule comprising time periods for emitting a temporary signal of opportunity; and
   the wireless infrastructure device receiving the temporary signal of opportunity according to the transmitted schedule.

8. The method of claim 1, wherein the refined location estimate meets a set of predetermined criteria, the set of predetermined criteria comprising accuracy criteria and authentication criteria.

9. The method of claim 1, wherein determining a coarse location in the plurality of coarse locations comprises an RF module associated with the wireless infrastructure device measuring a predetermined portion of an RF spectrum.

10. The method of claim 1, wherein determining a coarse location in the plurality of coarse locations comprises receiving beacons from at least one associated terminal device, the beacons providing signals of opportunity from which additional location data can be derived.

11. A device configured to determine a physical location of a wireless infrastructure device, the device comprising:
   a processor; and
   data storage containing instructions executable by the processor for causing the device to carry out a set of functions, the set of functions comprising:
      detecting a triggering event for determining a physical location of a wireless infrastructure device;
      responsive to detecting the triggering event, attempting to determine the physical location via a stand-alone location method;
      detecting a failure to determine the physical location via the stand-alone location method;
      responsive to detecting the failure to determine the physical location via the stand-alone method, determining a plurality of coarse locations of the wireless infrastructure device;
      determining a refined location estimate of the wireless infrastructure device based on the determined plurality of coarse locations of the wireless infrastructure device; and
      storing the determined refined location estimate as the physical location of the wireless infrastructure device.

12. The device of claim 11, wherein the stand-alone location method is GPS.

13. The device of claim 11, wherein the triggering event is selected from the group of triggering events consisting of the wireless infrastructure device being powered on, the wireless infrastructure device associating with a mobile device, a predetermined period of time elapsing, a new coarse location measurement being available, and the wireless infrastructure device detecting movement thereof.

14. The device of claim 11, wherein none of the coarse locations in the plurality of coarse locations satisfies a set of acceptance criteria, the set of acceptance criteria comprising required accuracy, timeliness, and authentication.

15. The device of claim 11, wherein at least one coarse location in the plurality of coarse locations is a user-entered street address of the wireless infrastructure device.

16. The device of claim 11, wherein at least one coarse location in the plurality of coarse locations is a location of an associated mobile terminal device for which the wireless infrastructure device cannot determine an accurate relative distance between itself and the mobile terminal device.

17. The device of claim 11, wherein at least one coarse location in the plurality of coarse locations is determined by:
   the wireless infrastructure device transmitting a schedule to an associated mobile device, the schedule comprising time periods for emitting a temporary signal of opportunity; and
   the wireless infrastructure device receiving the temporary signal of opportunity according to the transmitted schedule.

18. The device of claim 11, wherein the refined location estimate meets a set of predetermined criteria, the set of predetermined criteria comprising accuracy criteria and authentication criteria.

19. The device of claim 11, wherein determining a coarse location in the plurality of coarse locations comprises an RF module associated with the wireless infrastructure device measuring a predetermined portion of an RF spectrum.

20. The device of claim 11, wherein determining a coarse location in the plurality of coarse locations comprises receiving beacons from at least one associated terminal device, the beacons providing signals of opportunity from which additional location data can be derived.

* * * * *